US012795402B2

(12) United States Patent
Balevi et al.

(10) Patent No.: US 12,795,402 B2
(45) Date of Patent: Nov. 10, 2026

(54) PERFORMANCE MONITORING FOR ARTIFICIAL INTELLIGENCE (AI)/MACHINE LEARNING (ML) FUNCTIONALITIES AND MODELS

(71) Applicant: QUALCOMM Incorporated, San Diego, CA (US)

(72) Inventors: Eren Balevi, Brooklyn, NY (US); Taesang Yoo, San Diego, CA (US); Rajeev Kumar, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 331 days.

(21) Appl. No.: 18/425,999

(22) Filed: Jan. 29, 2024

(65) Prior Publication Data

US 2024/0340660 A1 Oct. 10, 2024

Related U.S. Application Data

(60) Provisional application No. 63/494,971, filed on Apr. 7, 2023.

(51) Int. Cl.
*H04W 24/02* (2009.01)
*G06N 3/0455* (2023.01)
*G06N 3/084* (2023.01)

(52) U.S. Cl.
CPC .......... *H04W 24/02* (2013.01); *G06N 3/0455* (2023.01); *G06N 3/084* (2013.01)

(58) Field of Classification Search
CPC ...... H04W 24/02; G06N 3/0455; G06N 3/084
USPC ........................................................ 455/22.1
See application file for complete search history.

(56) References Cited

U.S. PATENT DOCUMENTS

| | | | | |
|---|---|---|---|---|
| 2020/0367051 | A1* | 11/2020 | Wang | G06N 3/08 |
| 2020/0412417 | A1* | 12/2020 | Calzolari | H04B 7/0404 |
| 2021/0160149 | A1* | 5/2021 | Ma | H04L 1/0041 |
| 2021/0351885 | A1* | 11/2021 | Chavva | G06N 3/04 |
| 2021/0390434 | A1* | 12/2021 | Bai | H04W 24/02 |
| 2022/0286927 | A1* | 9/2022 | Madadi | H04W 36/0083 |
| 2023/0145844 | A1* | 5/2023 | Kwon | H04W 72/0453 370/329 |
| 2023/0164817 | A1* | 5/2023 | Bhamri | H04W 8/24 370/329 |
| 2023/0209390 | A1* | 6/2023 | Zeng | H04W 24/02 |
| 2023/0354063 | A1* | 11/2023 | Park | H04W 24/02 |
| 2024/0097764 | A1* | 3/2024 | Jeon | H04B 7/0626 |
| 2024/0098533 | A1* | 3/2024 | Leng | H04W 24/02 |
| 2024/0187877 | A1* | 6/2024 | Esswie | G06N 20/00 |
| 2024/0292236 | A1* | 8/2024 | Rydén | H04W 24/02 |
| 2024/0295625 | A1* | 9/2024 | Hasegawa | G01S 5/0263 |
| 2024/0306119 | A1* | 9/2024 | Wu | H04W 64/00 |
| 2024/0320488 | A1* | 9/2024 | Sun | G06N 3/0464 |
| 2024/0333601 | A1* | 10/2024 | Wang | H04B 7/0626 |
| 2024/0340634 | A1* | 10/2024 | Shrivastava | H04W 8/22 |
| 2024/0340680 | A1* | 10/2024 | Kela | H04W 24/10 |

(Continued)

*Primary Examiner* — Mark G. Pannell
(74) *Attorney, Agent, or Firm* — Shankar Krithivasan

(57) ABSTRACT

Systems and techniques are disclosed for performing wireless communications. For example, a wireless device (e.g., a user equipment (UE)) can transmit (or output for transmission), to a network entity, capability information related to a first functionality supported by a set of machine learning (ML) models of the apparatus. The wireless device can receive, from the network entity, a performance target associated with the first functionality.

30 Claims, 13 Drawing Sheets

(56) References Cited

U.S. PATENT DOCUMENTS

| | | | | |
|---|---|---|---|---|
| 2024/0378488 | A1* | 11/2024 | Hassan | G06N 3/098 |
| 2025/0038816 | A1* | 1/2025 | Beluri | H03M 7/70 |
| 2025/0168716 | A1* | 5/2025 | Hu | H04W 36/00837 |
| 2025/0203694 | A1* | 6/2025 | Kim | H04W 12/069 |
| 2025/0219748 | A1* | 7/2025 | Lee | H04B 17/3912 |
| 2025/0350539 | A1* | 11/2025 | Echigo | G06N 20/00 |
| 2025/0392523 | A1* | 12/2025 | Estevez | H04L 41/0853 |

* cited by examiner

PERFORMANCE MONITORING FOR ARTIFICIAL INTELLIGENCE (AI)/MACHINE LEARNING (ML) FUNCTIONALITIES AND MODELS

CROSS-REFERENCE TO RELATED APPLICATIONS

This application claims priority to U.S. Provisional Patent Application No. 63/494,971, filed Apr. 7, 2023, which is hereby incorporated by reference, in its entirety and for all purposes.

FIELD

The present disclosure generally relates to artificial intelligence (AI)/machine learning (ML)-based systems for wireless communications. For example, aspects of the present disclosure relate to systems and techniques for providing monitoring for AI/ML functionalities and models.

BACKGROUND

Wireless communications systems are deployed to provide various telecommunications and data services, including telephony, video, data, messaging, and broadcasts. Broadband wireless communications systems have developed through various generations, including a first-generation analog wireless phone service (1G), a second-generation (2G) digital wireless phone service (including interim 2.5G networks), a third-generation (3G) high speed data, Internet-capable wireless device, and a fourth-generation (4G) service (e.g., Long-Term Evolution (LTE), WiMax). Examples of wireless communications systems include code division multiple access (CDMA) systems, time division multiple access (TDMA) systems, frequency division multiple access (FDMA) systems, orthogonal frequency division multiple access (OFDMA) systems, Global System for Mobile communication (GSM) systems, etc. Other wireless communications technologies include 802.11 Wi-Fi, Bluetooth, among others.

A fifth-generation (5G) mobile standard calls for higher data transfer speeds, greater number of connections, and better coverage, among other improvements. The 5G standard (also referred to as "New Radio" or "NR"), according to Next Generation Mobile Networks Alliance, is designed to provide data rates of several tens of megabits per second to each of tens of thousands of users, with 1 gigabit per second to tens of workers on an office floor. Several hundreds of thousands of simultaneous connections should be supported in order to support large sensor deployments. Artificial intelligence (AI) and ML-based algorithms may be incorporated into the 5G and future standards to improve telecommunications and data services.

SUMMARY

The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary presents certain concepts relating to one or more aspects relating to the mechanisms disclosed herein in a simplified form to precede the detailed description presented below.

In the 3rd Generation Partnership Project (3GPP) Release 18 (Rel-18), AI/ML active discussions are ongoing. For instance, discussions are ongoing with respect to AI/ML functionality identification, AI/ML model identification, functionality-based Life Cycle Management (LCM), AI/ML model identification and model identifier (ID) based LCM, and performance requirements for functionality and models. AI/ML functionalities for a given feature may be predetermined offline. In some cases, UEs may decide which AI/ML functionalities for a given feature they can support. The supported AI/ML functionalities by UEs may change over time depending on one or more factors (e.g., power consumption). UEs may share the supported AI/ML functionality with the network (e.g., a base station, such as a gNB), such as with UE capability reporting. The network may perform functionality activation, deactivation, selection, switching, and/or fallback. Under each AI/ML functionality, a number of different models (e.g., AI/ML models) can be developed and trained by UEs and/or the network (e.g., a base station, such as a gNB) for UE-sided models and the UE part of two-sided models. Techniques are needed for providing mechanisms/signaling for announcing performance target(s) for AI/ML functionalities and mechanism/signaling for announcing expected performance for AI/ML models.

Systems and techniques are described herein for providing monitoring for AI/ML functionalities and models. According to aspects described herein, the current UE capability reporting mechanism in 3GPP can be revised such that UEs can provide UE capability information related to one or more functionalities and/or ML models supported by the UE. A network entity such (e.g., a base station, such as a gNB, or a portion of the base station) may be configured to support the UE using various technique disclosed herein. For instance, the systems and techniques provide mechanisms/signaling for announcing performance target(s) for AI/ML functionalities and mechanism/signaling for announcing expected performance for AI/ML models.

In one illustrative example, an apparatus for wireless communications is provided. The apparatus includes at least one memory and at least one processor coupled to the at least one memory. The at least one processor being configured to: output, for transmission to a network entity, capability information related to a first functionality supported by a set of machine learning (ML) models of the apparatus; and receive, from the network entity, a performance target associated with the first functionality.

As another example, a method of wireless communications at a user equipment (UE) is provided. The method includes: transmitting, to a network entity, capability information related to a first functionality supported by a set of machine learning (ML) models of the UE; and receiving, from the network entity, a performance target associated with the first functionality.

In another example, a non-transitory computer-readable medium of a user equipment (UE) having stored thereon instructions is provided. The instructions, when executed by at least one processor, cause the at least one processor to: output, for transmission to a network entity, capability information related to a first functionality supported by a set of machine learning (ML) models of the UE; and receive, from the network entity, a performance target associated with the first functionality.

As another example, an apparatus for wireless communications is provided. The apparatus includes: means for transmitting, to a network entity, capability information related to a first functionality supported by a set of machine learning (ML) models of the apparatus; and means for receiving, from the network entity, a performance target associated with the first functionality.

In another example, an apparatus for wireless communications is provided. The apparatus includes at least one memory and at least one processor coupled to the at least one memory. The at least one processor being configured to: receive, from a user equipment (UE), capability information related to a first functionality supported by a set of machine learning (ML) models of the UE; and output, for transmission to the UE, a performance target associated with the first functionality.

As another example, a method of wireless communications at a network entity is provided. The method includes: receiving, from a user equipment (UE), capability information related to a first functionality supported by a set of machine learning (ML) models of the UE; and transmitting, to the UE, a performance target associated with the first functionality.

In another example, a non-transitory computer-readable medium having stored thereon instructions is provided. The instructions, when executed by at least one processor, cause the at least one processor to: receive, from a user equipment (UE), capability information related to a first functionality supported by a set of machine learning (ML) models of the UE; and output, for transmission to the UE, a performance target associated with the first functionality.

As another example, an apparatus for wireless communications is provided. The apparatus includes: means for receiving, from a user equipment (UE), capability information related to a first functionality supported by a set of machine learning (ML) models of the UE; and means for transmitting, to the UE, a performance target associated with the first functionality.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

Other objects and advantages associated with the aspects disclosed herein will be apparent to those skilled in the art based on the accompanying drawings and detailed description.

BRIEF DESCRIPTION OF THE DRAWINGS

Examples of various implementations are described in detail below with reference to the following figures.

DETAILED DESCRIPTION

Figure 1:
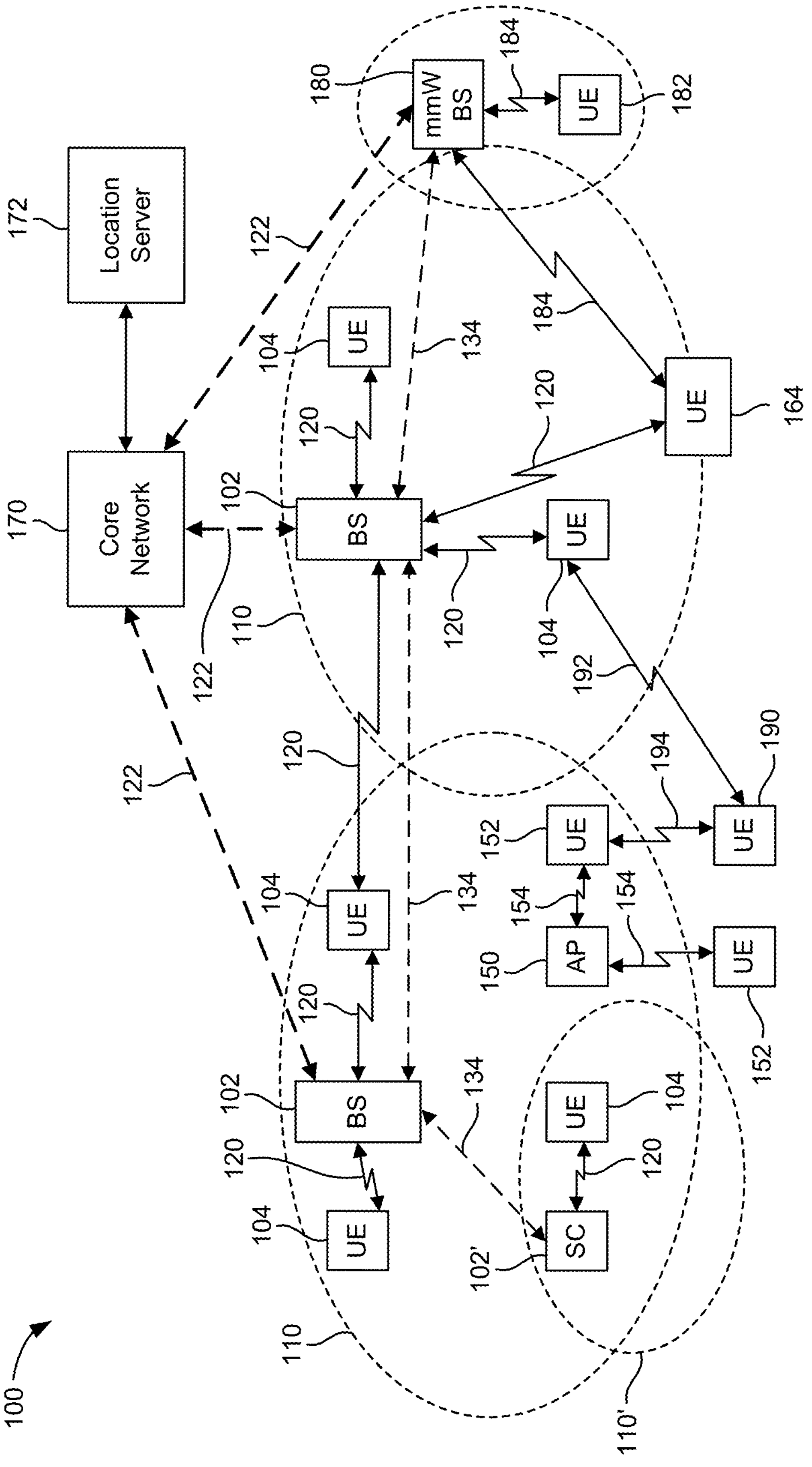
FIG. 1 is a block diagram illustrating an example of a wireless communication network, in accordance with some examples.

Certain aspects and embodiments of this disclosure are provided below. Some of these aspects and embodiments may be applied independently and some of them may be applied in combination as would be apparent to those of skill in the art. In the following description, for the purposes of explanation, specific details are set forth in order to provide a thorough understanding of embodiments of the application. However, it will be apparent that various embodiments may be practiced without these specific details. The figures and description are not intended to be restrictive.

The ensuing description provides example embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the application as set forth in the appended claims.

Wireless networks are deployed to provide various communication services, such as voice, video, packet data, messaging, broadcast, and the like. A wireless network may support both access links for communication between wireless devices. An access link may refer to any communication link between a client device (e.g., a user equipment (UE), a station (STA), or other client device) and a base station (e.g., a 3rd Generation Partnership Project (3GPP) gNodeB (gNB) for 5G/NR, a 3GPP eNodeB (CNB) for LTE, a Wi-Fi access point (AP), or other base station) or a component of a disaggregated base station (e.g., a central unit, a distributed unit, and/or a radio unit). In one example, an access link between a UE and a 3GPP gNB may be over a Uu interface. In some cases, an access link may support uplink signaling, downlink signaling, connection procedures, etc.

Various systems and techniques are provided with respect to wireless technologies (e.g., The 3GPP 5G/New Radio (NR) Standard) to provide improvements to wireless communications. A device (e.g., a UE) can be configured to generate or determine control information related to a communication channel upon which the device is communicating or is configured to communicate. For example, a UE can monitor a channel to determine information indicating a quality or state of the channel, which can be referred to as channel state information (CSI) or channel state feedback (CSF). The UE can transmit a report, message, or other signaling including the CSI or CSF to a network device, such as a base station (e.g., a gNB) or a portion of the base station (e.g., a central unit (CU), distributed unit (DU), radio unit (RU), Near-Real Time (Near-RT) radio access network (RAN) Intelligent Controller (RIC), or a Non-Real Time (Non-RT) RIC of a gNB).

In some cases, using an artificial intelligence (AI)/machine learning (ML)-based air interface, a first network device (e.g., a UE) and a second network device (e.g., a gNB) may use trained AI/ML models (also referred to herein as ML models) to implement a function. For instance, a UE that intends to convey CSI to a gNB can use a neural network (e.g., an encoder neural network model) to derive a compressed representation (also referred to as a latent representation) of the CSI for transmission to the gNB. The gNB may use another neural network (e.g., a decoder neural network model) to reconstruct the target CSI from the compressed representation.

In some cases, multiple ML models may be used by both UEs and network devices to implement functions that may be used to communicate with other devices (e.g., UE to network devices, network devices to UE, etc.). In cases where both the UE and network entity are using ML models to perform corresponding operations, the UE and network entity should use compatible ML models. In some cases, either or both the UE and the network entity may include one or more ML models for performing certain operations. For example, for an operation such as generating CSI information, a UE may include multiple ML models to generate and/or encode the CSI information for multiple frequency bands, antenna patterns, etc. Each of these ML models may take, as input, different parameters, and the UE may use different ML models for generating the CSI information based on what parameters are present/available. Similarly, the network device (e.g., network entity) may also include different ML models for decoding the CSI information and use of these different ML models may vary based on what parameters were used as input to generate/encode the CSI information.

In the 3rd Generation Partnership Project (3GPP) Release 18 (Rel-18), AI/ML active discussions are ongoing. For instance, discussions are ongoing with respect to AI/ML functionality identification, AI/ML model identification, functionality-based Life Cycle Management (LCM), AI/ML model identification and model identifier (ID) based LCM, and performance requirements for functionality and models.

AI/ML features include functionalities. That is, one AI/ML feature can correspond to a single functionality or multiple functionalities. Each functionality can have (or be associated with) one or more AI/ML models (also referred to herein as ML models). Assistance information can be used for AI/ML life cycle management (LCM), such as for functionality/model selection, switching, activation, deactivation, inference, and performance monitoring.

With respect to AI/ML functionality, AI/ML functionalities for a given feature may be pre-determined offline. In some cases, UEs may decide which AI/ML functionalities for a given feature they can support. The supported AI/ML functionalities by UEs may change over time depending on one or more factors (e.g., power consumption). UEs may share the supported AI/ML functionality with the network (e.g., a base station, such as a gNB), such as with UE capability reporting. The network may perform functionality activation, deactivation, selection, switching, and/or fallback. Under each AI/ML functionality, a number of different models (e.g., AI/ML models) can be developed and trained by UEs and/or the network (e.g., a base station, such as a gNB) for UE-sided models and the UE part of two-sided models.

Systems, apparatuses, processes (also referred to as methods), and computer-readable media (collectively referred to herein as "systems and techniques") are described herein for providing monitoring for AI/ML functionalities and models. According to aspects described herein, the current UE capability reporting mechanism in 3GPP can be revised such that UEs can provide UE capability information related to one or more functionalities and/or ML models supported by the UE. A network entity such (e.g., a base station, such as a gNB, or a portion of the base station) may be configured to support the UE using various technique disclosed herein. For instance, the systems and techniques provide mechanisms/signaling for announcing performance target(s) for AI/ML functionalities and mechanism/signaling for announcing expected performance for AI/ML models.

In some aspect, the systems and techniques may provide for functionality-based management of the UE. For instance, the network entity can provide performance target information (e.g., a performance target for one or more functionalities) to the UE. In one illustrative example, for each AI/ML functionality supported by UE, the network may announce a respective performance target (e.g., direct KPI of the AI/ML model) attached to each functionality. In some cases, the performance target can be function of UE battery status, computational resources, any combination thereof, and/or other factors. In some examples, there can be multiple performance targets for a functionality (e.g., for low complexity models, medium complexity models, high complexity models, etc.). The complexity of a ML model can be based on the size of the ML model, number of parameters of the ML model.

The UE and/or network entity can manage the lifecycle of the ML models based on the target performance. For example, using the performance target shared by the network entity, the UE and/or the network entity can test the efficiency of the model development and training step (e.g., whether model has an acceptable performance or not). In some cases, UEs may meet the performance target individually for each model within AI/ML functionality. In some cases, UEs may meet the performance target as the average performance of all models within AI/ML functionality. In another example, using the performance target shared by the network entity, the UE and/or the network entity can monitor the performance of the corresponding models within an AI/ML functionality. In some cases, UEs may meet the performance target for the active model within AI/ML functionality. In some cases, UEs may meet the performance target for the inactive models within AI/ML functionality. In another example, using the performance target for the functionality, the UE and/or the network entity can activate, deactivate, and/or switch the functionality (e.g., activate a functionality, deactivate a functionality, switch functionalities, or fall back to a different functionality, such as a non-ML-based functionality). In another example, using the performance target for the functionality, the UE and/or the network entity can perform model activation, deactivation, selection, switching, and/or fallback within the functionality (e.g., switch from one model to another to meet the performance target of the functionality).

With respect to signaling, the UE can transmit AI/ML functionality support (e.g., with UE capability reporting) to the network (e.g., to the network entity). The network entity can transmit the performance target (e.g., direct KPI of the functionality/model) to the UE.

In another aspect, the UE and/or network entity can perform model-based functionality management based on the performance of the UE. For instance, operations of AI/ML models can be performed in relation to the performance target for functionality. In some aspects, AI/ML models are trained according to the functionality performance target (e.g., provided by the network entity to the UE as described above) to obtain an expected performance metric. In some cases, the expected performance cannot be worse than the functionality performance target that the AI/ML model is intended for. The AI/ML model may be trained at the UE-side or at the network-side. In some examples, the trained AI/ML models within a functionality are registered/identified to the network (e.g., the 3GPP network, such as a gNB) and assigned model identifiers (IDs). In some cases, for each AI/ML model, the expected performance is provided as a part of model registration and/or identification (or meta information) with the network for model monitoring.

Using the expected performance provided for each AI/ML model, the network entity and/or the UE can monitor the performance of the corresponding model. In some cases, the network entity and/or the UE can perform model activation, deactivation, selection, switching, fallback (e.g., activate an ML model, deactivate an ML model, switch ML models, or fall back to a non-ML model).

With respect to signaling, the UE can transmit AI/ML model support for a functionality to the network entity (e.g., UEs can share the supported model IDs with the network). The UE can additionally or alternatively transmit expected performance for each AI/ML model to the network entity (e.g., via proprietary method, application function (AF), Operations, Administration and Maintenance (OAM)/Service Management and Orchestration (SMO), etc.).

Additional aspects of the present disclosure are described in more detail below.

As used herein, the terms "user equipment" (UE) and "network entity" are not intended to be specific or otherwise limited to any particular radio access technology (RAT), unless otherwise noted. In general, a UE may be any wireless communication device (e.g., a mobile phone, router, tablet computer, laptop computer, and/or tracking device, etc.), wearable (e.g., smartwatch, smart-glasses, wearable ring, and/or an extended reality (XR) device such as a virtual reality (VR) headset, an augmented reality (AR) headset or glasses, or a mixed reality (MR) headset), vehicle (e.g., automobile, motorcycle, bicycle, etc.), and/or Internet of Things (IoT) device, etc., used by a user to communicate over a wireless communications network. A UE may be mobile or may (e.g., at certain times) be stationary, and may communicate with a radio access network (RAN). As used herein, the term "UE" may be referred to interchangeably as an "access terminal" or "AT," a "client device," a "wireless device," a "subscriber device," a "subscriber terminal," a "subscriber station," a "user terminal" or "UT," a "mobile device," a "mobile terminal," a "mobile station," or variations thereof. Generally, UEs may communicate with a core network via a RAN, and through the core network the UEs may be connected with external networks such as the Internet and with other UEs. Of course, other mechanisms of connecting to the core network and/or the Internet are also possible for the UEs, such as over wired access networks, wireless local area network (WLAN) networks (e.g., based on IEEE 802.11 communication standards, etc.) and so on.

A network entity may be implemented in an aggregated or monolithic base station architecture, or alternatively, in a disaggregated base station architecture, and may include one or more of a central unit (CU), a distributed unit (DU), a radio unit (RU), a Near-Real Time (Near-RT) RAN Intelligent Controller (RIC), or a Non-Real Time (Non-RT) RIC. A base station (e.g., with an aggregated/monolithic base station architecture or disaggregated base station architecture) may operate according to one of several RATs in communication with UEs depending on the network in which it is deployed, and may be alternatively referred to as an access point (AP), a network node, a NodeB (NB), an evolved NodeB (eNB), a next generation eNB (ng-eNB), a New Radio (NR) Node B (also referred to as a gNB or gNodeB), etc. A base station may be used primarily to support wireless access by UEs, including supporting data, voice, and/or signaling connections for the supported UEs. In some systems, a base station may provide edge node signaling functions while in other systems it may provide additional control and/or network management functions. A communication link through which UEs may send signals to a base station is called an uplink (UL) channel (e.g., a reverse traffic channel, a reverse control channel, an access channel, etc.). A communication link through which the base station may send signals to UEs is called a downlink (DL) or forward link channel (e.g., a paging channel, a control channel, a broadcast channel, or a forward traffic channel, etc.). The term traffic channel (TCH), as used herein, may refer to either an uplink, reverse or downlink, and/or a forward traffic channel.

The term "network entity" or "base station" (e.g., with an aggregated/monolithic base station architecture or disaggregated base station architecture) may refer to a single physical transmit receive point (TRP) or to multiple physical TRPs that may or may not be co-located. For example, where the term "network entity" or "base station" refers to a single physical TRP, the physical TRP may be an antenna of the base station corresponding to a cell (or several cell sectors) of the base station. Where the term "network entity" or "base station" refers to multiple co-located physical TRPs, the physical TRPs may be an array of antennas (e.g., as in a multiple-input multiple-output (MIMO) system or where the base station employs beamforming) of the base station. Where the term "base station" refers to multiple non-co-located physical TRPs, the physical TRPs may be a distributed antenna system (DAS) (a network of spatially separated antennas connected to a common source via a transport medium) or a remote radio head (RRH) (a remote base station connected to a serving base station). Alternatively, the non-co-located physical TRPs may be the serving base station receiving the measurement report from the UE and a neighbor base station whose reference radio frequency (RF) signals (or simply "reference signals") the UE is measuring. Because a TRP is the point from which a base station transmits and receives wireless signals, as used herein, references to transmission from or reception at a base station are to be understood as referring to a particular TRP of the base station.

In some implementations that support positioning of UEs, a network entity or base station may not support wireless access by UEs (e.g., may not support data, voice, and/or signaling connections for UEs), but may instead transmit reference signals to UEs to be measured by the UEs, and/or may receive and measure signals transmitted by the UEs. Such a base station may be referred to as a positioning beacon (e.g., when transmitting signals to UEs) and/or as a location measurement unit (e.g., when receiving and measuring signals from UEs).

An RF signal comprises an electromagnetic wave of a given frequency that transports information through the space between a transmitter and a receiver. As used herein, a transmitter may transmit a single "RF signal" or multiple "RF signals" to a receiver. However, the receiver may receive multiple "RF signals" corresponding to each transmitted RF signal due to the propagation characteristics of RF signals through multipath channels. The same transmitted RF signal on different paths between the transmitter and receiver may be referred to as a "multipath" RF signal. As used herein, an RF signal may also be referred to as a "wireless signal" or simply a "signal" where it is clear from the context that the term "signal" refers to a wireless signal or an RF signal.

Various aspects of the systems and techniques described herein will be discussed below with respect to the figures. According to various aspects, FIG. 1 illustrates an example of a wireless communications system 100. The wireless communications system 100 (which may also be referred to as a wireless wide area network (WWAN)) may include various base stations 102 and various UEs 104. In some aspects, the base stations 102 may also be referred to as "network entities" or "network nodes." One or more of the base stations 102 may be implemented in an aggregated or monolithic base station architecture. Additionally, or alternatively, one or more of the base stations 102 may be implemented in a disaggregated base station architecture, and may include one or more of a central unit (CU), a distributed unit (DU), a radio unit (RU), a Near-Real Time (Near-RT) RAN Intelligent Controller (RIC), or a Non-Real Time (Non-RT) RIC. The base stations 102 may include macro cell base stations (high power cellular base stations) and/or small cell base stations (low power cellular base stations). In an aspect, the macro cell base station may include eNBs and/or ng-eNBs where the wireless communications system 100 corresponds to a long term evolution (LTE) network, or gNBs where the wireless communications system 100 corresponds to a NR network, or a combination of both, and the small cell base stations may include femtocells, picocells, microcells, etc.

The base stations 102 may collectively form a RAN and interface with a core network 170 (e.g., an evolved packet core (EPC) or a 5G core (5GC)) through backhaul links 122, and through the core network 170 to one or more location servers 172 (which may be part of core network 170 or may be external to core network 170). In addition to other functions, the base stations 102 may perform functions that relate to one or more of transferring user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, RAN sharing, multimedia broadcast multicast service (MBMS), subscriber and equipment trace, RAN information management (RIM), paging, positioning, and delivery of warning messages. The base stations 102 may communicate with each other directly or indirectly (e.g., through the EPC or 5GC) over backhaul links 134, which may be wired and/or wireless.

The base stations 102 may wirelessly communicate with the UEs 104. Each of the base stations 102 may provide communication coverage for a respective geographic coverage area 110. In an aspect, one or more cells may be supported by a base station 102 in each coverage area 110. A "cell" is a logical communication entity used for communication with a base station (e.g., over some frequency resource, referred to as a carrier frequency, component carrier, carrier, band, or the like), and may be associated with an identifier (e.g., a physical cell identifier (PCI), a virtual cell identifier (VCI), a cell global identifier (CGI)) for distinguishing cells operating via the same or a different carrier frequency. In some cases, different cells may be configured according to different protocol types (e.g., machine-type communication (MTC), narrowband IoT (NB-IoT), enhanced mobile broadband (eMBB), or others) that may provide access for different types of UEs. Because a cell is supported by a specific base station, the term "cell" may refer to either or both of the logical communication entity and the base station that supports it, depending on the context. In addition, because a TRP is typically the physical transmission point of a cell, the terms "cell" and "TRP" may be used interchangeably. In some cases, the term "cell" may also refer to a geographic coverage area of a base station (e.g., a sector), insofar as a carrier frequency may be detected and used for communication within some portion of geographic coverage areas 110.

While neighboring macro cell base station 102 geographic coverage areas 110 may partially overlap (e.g., in a handover region), some of the geographic coverage areas 110 may be substantially overlapped by a larger geographic coverage area 110. For example, a small cell base station 102' may have a coverage area 110' that substantially overlaps with the coverage area 110 of one or more macro cell base stations 102. A network that includes both small cell and macro cell base stations may be known as a heterogeneous network. A heterogeneous network may also include home eNBs (HeNBs), which may provide service to a restricted group known as a closed subscriber group (CSG).

The communication links 120 between the base stations 102 and the UEs 104 may include uplink (also referred to as reverse link) transmissions from a UE 104 to a base station 102 and/or downlink (also referred to as forward link) transmissions from a base station 102 to a UE 104. The communication links 120 may use MIMO antenna technology, including spatial multiplexing, beamforming, and/or transmit diversity. The communication links 120 may be through one or more carrier frequencies. Allocation of carriers may be asymmetric with respect to downlink and uplink (e.g., more or less carriers may be allocated for downlink than for uplink).

The wireless communications system 100 may further include a WLAN AP 150 in communication with WLAN stations (STAs) 152 via communication links 154 in an unlicensed frequency spectrum (e.g., 5 Gigahertz (GHz)). When communicating in an unlicensed frequency spectrum, the WLAN STAs 152 and/or the WLAN AP 150 may perform a clear channel assessment (CCA) or listen before talk (LBT) procedure prior to communicating in order to determine whether the channel is available. In some examples, the wireless communications system 100 may include devices (e.g., UEs, etc.) that communicate with one or more UEs 104, base stations 102, APs 150, etc. utilizing the ultra-wideband (UWB) spectrum. The UWB spectrum may range from 3.1 to 10.5 GHZ.

The small cell base station 102' may operate in a licensed and/or an unlicensed frequency spectrum. When operating in an unlicensed frequency spectrum, the small cell base station 102' may employ LTE or NR technology and use the same 5 GHz unlicensed frequency spectrum as used by the WLAN AP 150. The small cell base station 102', employing LTE and/or 5G in an unlicensed frequency spectrum, may boost coverage to and/or increase capacity of the access network. NR in unlicensed spectrum may be referred to as NR-U. LTE in an unlicensed spectrum may be referred to as LTE-U, licensed assisted access (LAA), or MulteFire.

The wireless communications system 100 may further include a millimeter wave (mmW) base station 180 that may operate in mmW frequencies and/or near mmW frequencies in communication with a UE 182. The mmW base station 180 may be implemented in an aggregated or monolithic base station architecture, or alternatively, in a disaggregated base station architecture (e.g., including one or more of a CU, a DU, a RU, a Near-RT RIC, or a Non-RT RIC). Extremely high frequency (EHF) is part of the RF in the electromagnetic spectrum. EHF has a range of 30 GHz to 300 GHz and a wavelength between 1 millimeter and 10 millimeters. Radio waves in this band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW and/or near mmW radio frequency band have high path loss and a relatively short range. The mmW base station 180 and the UE 182 may utilize beamforming (transmit and/or receive) over an mmW communication link 184 to compensate for the extremely high path loss and short range. Further, it will be appreciated that in alternative configurations, one or more base stations 102 may also transmit using mmW or near mmW and beamforming. Accordingly, it will be appreciated that the foregoing illustrations are merely examples and should not be construed to limit the various aspects disclosed herein.

In some aspects relating to 5G, the frequency spectrum in which wireless network nodes or entities (e.g., base stations 102/180, UEs 104/182) operate is divided into multiple frequency ranges, FR1 (from 450 to 6000 Megahertz (MHZ)), FR2 (from 24250 to 52600 MHZ), FR3 (above 52600 MHZ), and FR4 (between FR1 and FR2). In a multi-carrier system, such as 5G, one of the carrier frequencies is referred to as the "primary carrier" or "anchor carrier" or "primary serving cell" or "PCell," and the remaining carrier frequencies are referred to as "secondary carriers" or "secondary serving cells" or "SCells." In carrier aggregation, the anchor carrier is the carrier operating on the primary frequency (e.g., FR1) utilized by a UE 104/182 and the cell in which the UE 104/182 either performs the initial radio resource control (RRC) connection establishment procedure or initiates the RRC connection re-establishment procedure. The primary carrier carries all common and UE-specific control channels and may be a carrier in a licensed frequency (however, this is not always the case). A secondary carrier is a carrier operating on a second frequency (e.g., FR2) that may be configured once the RRC connection is established between the UE 104 and the anchor carrier and that may be used to provide additional radio resources. In some cases, the secondary carrier may be a carrier in an unlicensed frequency. The secondary carrier may contain only necessary signaling information and signals, for example, those that are UE-specific may not be present in the secondary carrier, since both primary uplink and downlink carriers are typically UE-specific. This means that different UEs 104/182 in a cell may have different downlink primary carriers. The same is true for the uplink primary carriers. The network is able to change the primary carrier of any UE 104/182 at any time. This is done, for example, to balance the load on different carriers. Because a "serving cell" (whether a PCell or an SCell) corresponds to a carrier frequency and/or component carrier over which some base station is communicating, the term "cell," "serving cell," "component carrier," "carrier frequency," and the like may be used interchangeably.

For example, still referring to FIG. 1, one of the frequencies utilized by the macro cell base stations 102 may be an anchor carrier (or "PCell") and other frequencies utilized by the macro cell base stations 102 and/or the mmW base station 180 may be secondary carriers ("SCells"). In carrier aggregation, the base stations 102 and/or the UEs 104 may use spectrum up to Y MHz (e.g., 5, 10, 15, 20, 100 MHZ) bandwidth per carrier up to a total of Yx MHZ (x component carriers) for transmission in each direction. The component carriers may or may not be adjacent to each other on the frequency spectrum. Allocation of carriers may be asymmetric with respect to the downlink and uplink (e.g., more or less carriers may be allocated for downlink than for uplink). The simultaneous transmission and/or reception of multiple carriers enables the UE 104/182 to significantly increase its data transmission and/or reception rates. For example, two 20 MHZ aggregated carriers in a multi-carrier system would theoretically lead to a two-fold increase in data rate (i.e., 40 MHZ), compared to that attained by a single 20 MHz carrier.

In order to operate on multiple carrier frequencies, a base station 102 and/or a UE 104 may be equipped with multiple receivers and/or transmitters. For example, a UE 104 may have two receivers, "Receiver 1" and "Receiver 2," where "Receiver 1" is a multi-band receiver that may be tuned to band (i.e., carrier frequency) 'X' or band 'Y,' and "Receiver 2" is a one-band receiver tuneable to band 'Z' only. In this example, if the UE 104 is being served in band 'X,' band 'X' would be referred to as the PCell or the active carrier frequency, and "Receiver 1" would need to tune from band 'X' to band 'Y' (an SCell) in order to measure band 'Y' (and vice versa). In contrast, whether the UE 104 is being served in band 'X' or band 'Y,' because of the separate "Receiver 2," the UE 104 may measure band 'Z' without interrupting the service on band 'X' or band 'Y.'

The wireless communications system 100 may further include a UE 164 that may communicate with a macro cell base station 102 over a communication link 120 and/or the mmW base station 180 over an mmW communication link 184. For example, the macro cell base station 102 may support a PCell and one or more SCells for the UE 164 and the mmW base station 180 may support one or more SCells for the UE 164.

The wireless communications system 100 may further include one or more UEs, such as UE 190, that connects indirectly to one or more communication networks via one or more device-to-device (D2D) peer-to-peer (P2P) links (referred to as "sidelinks"). In the example of FIG. 1, UE 190 has a D2D P2P link 192 with one of the UEs 104 connected to one of the base stations 102 (e.g., through which UE 190 may indirectly obtain cellular connectivity) and a D2D P2P link 194 with WLAN STA 152 connected to the WLAN AP 150 (through which UE 190 may indirectly obtain WLAN-based Internet connectivity). In an example, the D2D P2P links 192 and 194 may be supported with any well-known D2D RAT, such as LTE Direct (LTE-D), Wi-Fi Direct (Wi-Fi-D), Bluetooth®, and so on.

Figure 2:
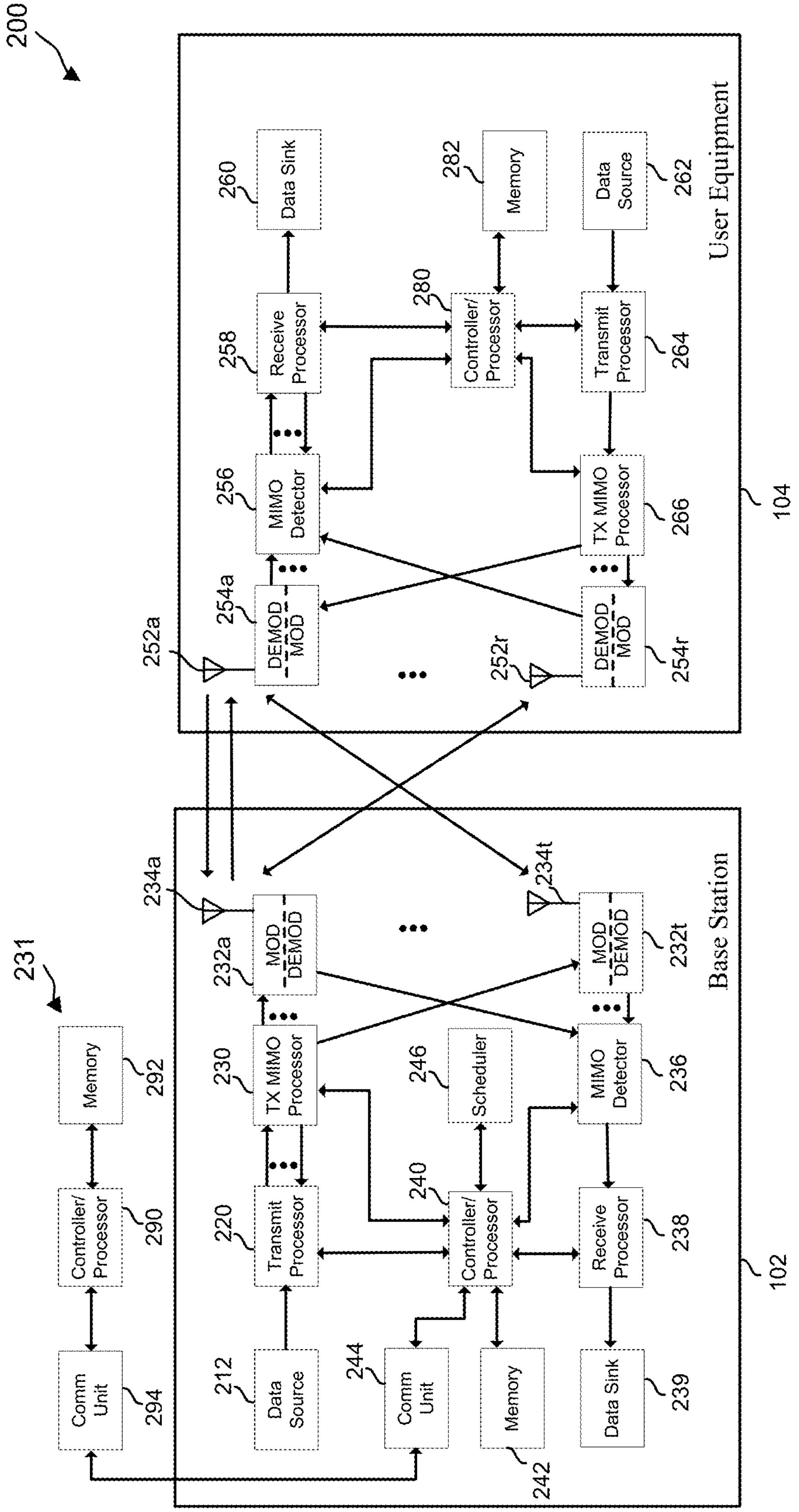
FIG. 2 is a diagram illustrating a design of a base station and a User Equipment (UE) device that enable transmission and processing of signals exchanged between the UE and the base station, in accordance with some examples.

FIG. 2 shows a block diagram of a design of a base station 102 and a UE 104 that enable transmission and processing of signals exchanged between the UE and the base station, in accordance with some aspects of the present disclosure. Design 200 includes components of a base station 102 and a UE 104, which may be one of the base stations 102 and one of the UEs 104 in FIG. 1. Base station 102 may be equipped with T antennas 234*a* through 234*t*, and UE 104 may be equipped with R antennas 252*a* through 252*r*, where in general T≥1 and R≥1.

At base station 102, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, channel state information, channel state feedback, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232*a* through 232*t*. The modulators 232*a* through 232*t* are shown as a combined modulator-demodulator (MOD-DEMOD). In some cases, the modulators and demodulators may be separate components. Each modulator of the modulators 232*a* to 232*t* may process a respective output symbol stream, e.g., for an orthogonal frequency-division multiplexing (OFDM) scheme and/or the like, to obtain an output sample stream. Each modulator of the modulators 232*a* to 232*t* may further process (e.g., convert to analog, amplify, filter, and upconvert) the output sample stream to obtain a downlink signal. T downlink signals may be transmitted from modulators 232*a* to 232*t* via T antennas 234*a* through 234*t*, respectively. According to certain aspects described in more detail below, the synchronization signals may be generated with location encoding to convey additional information.

At UE 104, antennas 252*a* through 252*r* may receive the downlink signals from base station 102 and/or other base stations and may provide received signals to demodulators (DEMODs) 254*a* through 254*r*, respectively. The demodulators 254*a* through 254*r* are shown as a combined modulator-demodulator (MOD-DEMOD). In some cases, the modulators and demodulators may be separate components. Each demodulator of the demodulators 254*a* through 254*r* may condition (e.g., filter, amplify, downconvert, and digitize) a received signal to obtain input samples. Each demodulator of the demodulators 254*a* through 254*r* may further process the input samples (e.g., for OFDM and/or the like) to obtain received symbols. A MIMO detector 256 may obtain received symbols from all R demodulators 254*a* through 254*r*, perform MIMO detection on the received symbols if applicable, and provide detected symbols. A receive processor 258 may process (e.g., demodulate and decode) the detected symbols, provide decoded data for UE 104 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like.

On the uplink, at UE 104, a transmit processor 264 may receive and process data from a data source 262 and control information (e.g., for reports comprising RSRP, RSSI, RSRQ, CQI, channel state information, channel state feedback, and/or the like) from controller/processor 280. Transmit processor 264 may also generate reference symbols for one or more reference signals (e.g., based at least in part on a beta value or a set of beta values associated with the one or more reference signals). The symbols from transmit processor 264 may be precoded by a TX-MIMO processor 266 if application, further processed by modulators 254*a* through 254*r* (e.g., for DFT-s-OFDM, CP-OFDM, and/or the like), and transmitted to base station 102. At base station 102, the uplink signals from UE 104 and other UEs may be received by antennas 234*a* through 234*t*, processed by demodulators 232*a* through 232*t*, detected by a MIMO detector 236 if applicable, and further processed by a receive processor 238 to obtain decoded data and control information sent by UE 104. Receive processor 238 may provide the decoded data to a data sink 239 and the decoded control information to controller (processor) 240. Base station 102 may include communication unit 244 and communicate to a network controller 231 via communication unit 244. Network controller 231 may include communication unit 294, controller/processor 290, and memory 282.

In some aspects, one or more components of UE 104 may be included in a housing. Controller 240 of base station 102, controller/processor 280 of UE 104, and/or any other component(s) of FIG. 2 may perform one or more techniques associated with implicit UCI beta value determination for NR.

Memories 242 and 282 may store data and program codes for the base station 102 and the UE 104, respectively. A scheduler 246 may schedule UEs for data transmission on the downlink, uplink, and/or sidelink.

In some aspects, deployment of communication systems, such as 5G new radio (NR) systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (eNB), NR BS, 5G NB, access point (AP), a transmit receive point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU also may be implemented as virtual units, i.e., a virtual central unit (VCU), a virtual distributed unit (VDU), or a virtual radio unit (VRU).

Base station-type operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which may enable flexibility in network design. The various units of the disaggregated base station, or disaggregated RAN architecture, may be configured for wired or wireless communication with at least one other unit.

Figure 3:
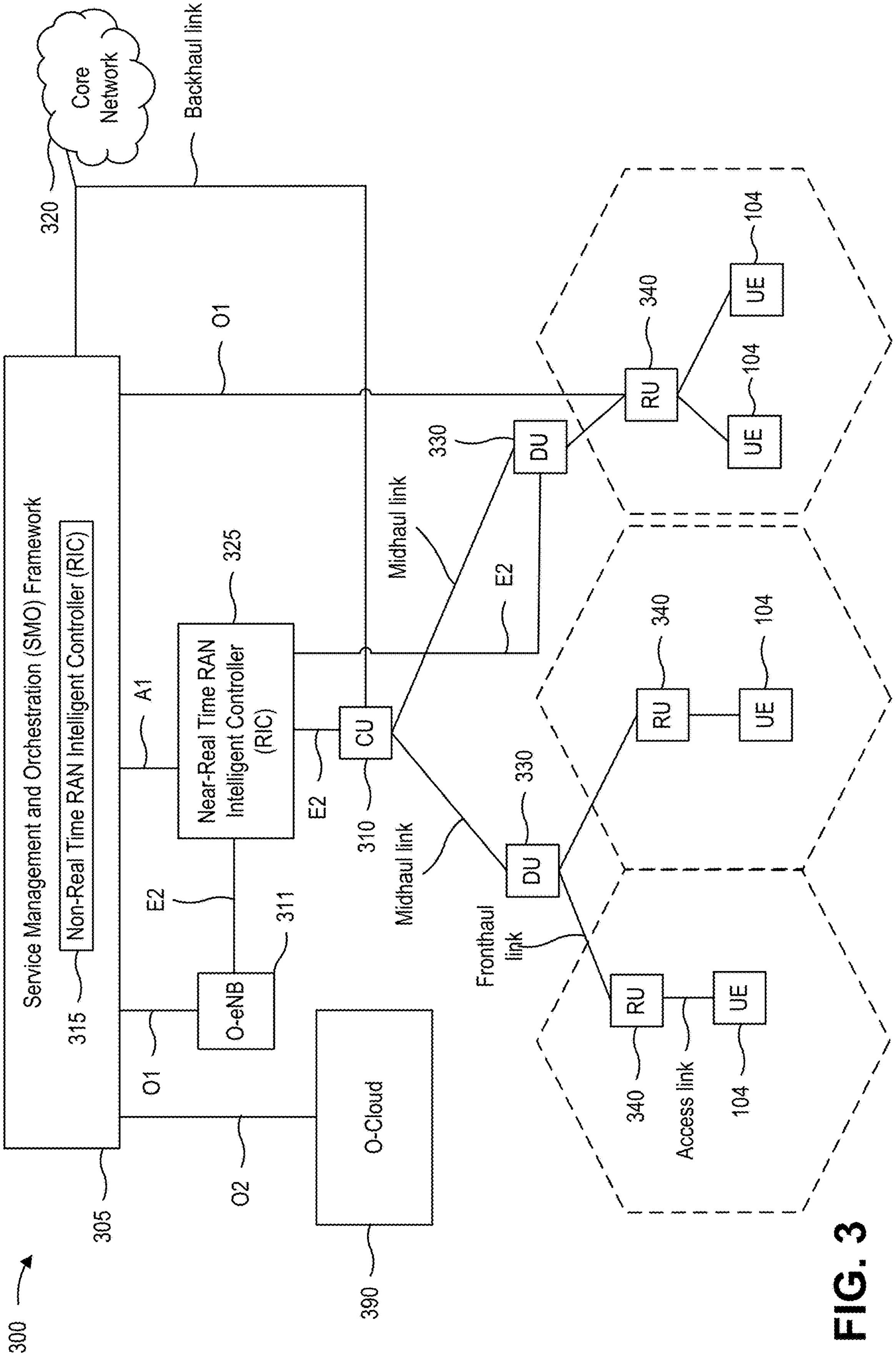
FIG. 3 is a diagram illustrating an example of a disaggregated base station, in accordance with some examples.

FIG. 3 shows a diagram illustrating an example disaggregated base station 300 architecture. The disaggregated base station 300 architecture may include one or more central units (CUs) 310 that may communicate directly with a core network 320 via a backhaul link, or indirectly with the core network 320 through one or more disaggregated base station units (such as a Near-Real Time (Near-RT) RAN Intelligent Controller (RIC) 325 via an E2 link, or a Non-Real Time (Non-RT) RIC 315 associated with a Service Management and Orchestration (SMO) Framework 305, or both). A CU 310 may communicate with one or more distributed units (DUs) 330 via respective midhaul links, such as an F1 interface. The DUs 330 may communicate with one or more radio units (RUs) 340 via respective fronthaul links. The RUs 340 may communicate with respective UEs 104 via one or more radio frequency (RF) access links. In some implementations, the UE 104 may be simultaneously served by multiple RUs 340.

Each of the units, e.g., the CUs 310, the DUs 330, the RUs 340, as well as the Near-RT RICs 325, the Non-RT RICs 315 and the SMO Framework 305, may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, may be configured to communicate with one or more of the other units via the transmission medium. For example, the units may include a wired interface configured to receive or transmit signals over a wired transmission medium to one or more of the other units. Additionally, the units may include a wireless interface, which may include a receiver, a transmitter or transceiver (such as a radio frequency (RF) transceiver), configured to receive or transmit signals, or both, over a wireless transmission medium to one or more of the other units.

In some aspects, the CU 310 may host one or more higher layer control functions. Such control functions may include radio resource control (RRC), packet data convergence protocol (PDCP), service data adaptation protocol (SDAP), or the like. Each control function may be implemented with an interface configured to communicate signals with other control functions hosted by the CU 310. The CU 310 may be configured to handle user plane functionality (i.e., Central Unit-User Plane (CU-UP)), control plane functionality (i.e., Central Unit-Control Plane (CU-CP)), or a combination thereof. In some implementations, the CU 310 may be logically split into one or more CU-UP units and one or more CU-CP units. The CU-UP unit may communicate bidirectionally with the CU-CP unit via an interface, such as the E1 interface when implemented in an O-RAN configuration. The CU 310 may be implemented to communicate with the DU 330, as necessary, for network control and signaling.

The DU 330 may correspond to a logical unit that includes one or more base station functions to control the operation of one or more RUs 340. In some aspects, the DU 330 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the 3rd Generation Partnership Project (3GPP). In some aspects, the DU 330 may further host one or more low PHY layers. Each layer (or module) may be implemented with an interface configured to communicate signals with other layers (and modules) hosted by the DU 330, or with the control functions hosted by the CU 310.

Lower-layer functionality may be implemented by one or more RUs 340. In some deployments, an RU 340, controlled by a DU 330, may correspond to a logical node that hosts RF processing functions, or low-PHY layer functions (such as performing fast Fourier transform (FFT), inverse FFT (IFFT), digital beamforming, physical random access channel (PRACH) extraction and filtering, or the like), or both, based at least in part on the functional split, such as a lower layer functional split. In such an architecture, the RU(s) 340 may be implemented to handle over the air (OTA) communication with one or more UEs 104. In some implementations, real-time and non-real-time aspects of control and user plane communication with the RU(s) 340 may be controlled by the corresponding DU 330. In some scenarios, this configuration may enable the DU(s) 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements which may be managed via an operations and maintenance interface (such as an O1 interface). For virtualized network elements, the SMO Framework 305 may be configured to interact with a cloud computing platform (such as an open cloud (O-Cloud) 390) to perform network element life cycle management (such as to instantiate virtualized network elements) via a cloud computing platform interface (such as an O2 interface). Such virtualized network elements may include, but are not limited to, CUs 310, DUs 330, RUS 340 and Near-RT RICs 325. In some implementations, the SMO Framework 305 may communicate with a hardware aspect of a 4G RAN, such as an open eNB (O-eNB) 311, via an O1 interface. Additionally, in some implementations, the SMO Framework 305 may communicate directly with one or more RUs 340 via an O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (such as via an A1 interface) the Near-RT RIC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT RIC 315 or the Near-RT RIC 325 may be configured to tune RAN behavior or performance. For example, the Non-RT RIC 315 may monitor long-term trends and patterns for performance and employ AI/ML models to perform corrective actions through the SMO Framework 305 (such as reconfiguration via 01) or via creation of RAN management policies (such as A1 policies).

Figure 4:
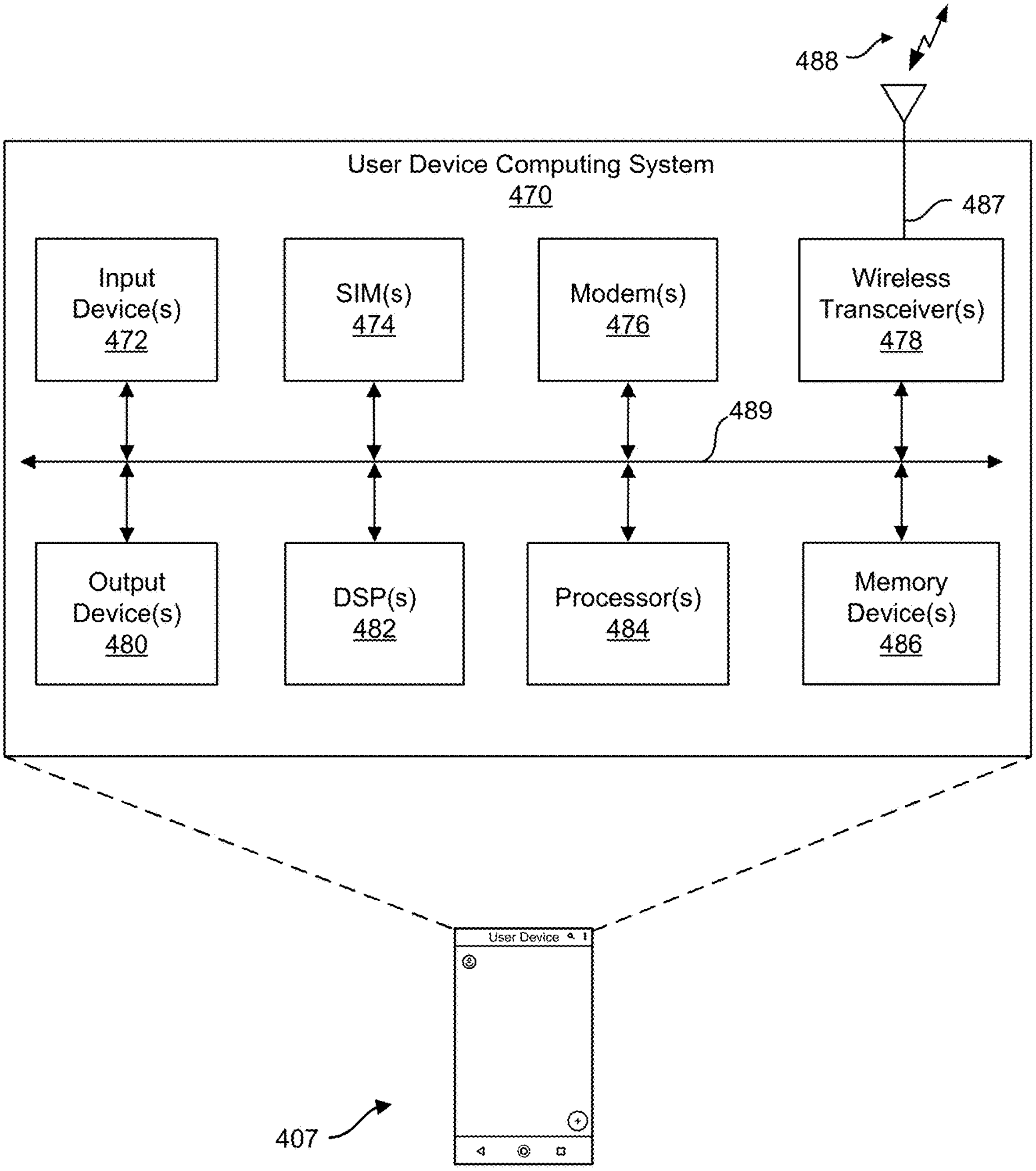
FIG. 4 is a block diagram illustrating components of a user equipment, in accordance with some examples.

FIG. 4 illustrates an example of a computing system 470 of a wireless device 407. The wireless device 407 may include a client device such as a UE (e.g., UE 104, UE 152, UE 190) or other type of device (e.g., a station (STA) configured to communication using a Wi-Fi interface) that may be used by an end-user. For example, the wireless device 407 may include a mobile phone, router, tablet computer, laptop computer, tracking device, wearable device (e.g., a smart watch, glasses, an extended reality (XR) device such as a virtual reality (VR), augmented reality (AR) or mixed reality (MR) device, etc.), Internet of Things (IoT) device, access point, and/or another device that is configured to communicate over a wireless communications network. The computing system 470 includes software and hardware components that may be electrically or communicatively coupled via a bus 489 (or may otherwise be in communication, as appropriate). For example, the computing system 470 includes one or more processors 484. The one or more processors 484 may include one or more CPUs, ASICs, FPGAS, APs, GPUs, VPUs, NSPs, microcontrollers, dedicated hardware, any combination thereof, and/or other processing device or system. The bus 489 may be used by the one or more processors 484 to communicate between cores and/or with the one or more memory devices 486.

The computing system 470 may also include one or more memory devices 486, one or more digital signal processors (DSPs) 482, one or more subscriber identity modules (SIMs) 474, one or more modems 476, one or more wireless transceivers 478, one or more antennas 487, one or more input devices 472 (e.g., a camera, a mouse, a keyboard, a touch sensitive screen, a touch pad, a keypad, a microphone, and/or the like), and one or more output devices 480 (e.g., a display, a speaker, a printer, and/or the like).

In some aspects, computing system 470 may include one or more radio frequency (RF) interfaces configured to transmit and/or receive RF signals. In some examples, an RF interface may include components such as modem(s) 476, wireless transceiver(s) 478, and/or antennas 487. The one or more wireless transceivers 478 may transmit and receive wireless signals (e.g., signal 488) via antenna 487 from one or more other devices, such as other wireless devices, network devices (e.g., base stations such as eNBs and/or gNBs, Wi-Fi access points (APs) such as routers, range extenders or the like, etc.), cloud networks, and/or the like. In some examples, the computing system 470 may include multiple antennas or an antenna array that may facilitate simultaneous transmit and receive functionality. Antenna 487 may be an omnidirectional antenna such that radio frequency (RF) signals may be received from and transmitted in all directions. The wireless signal 488 may be transmitted via a wireless network. The wireless network may be any wireless network, such as a cellular or telecommunications network (e.g., 3G, 4G, 5G, etc.), wireless local area network (e.g., a Wi-Fi network), a Bluetooth™ network, and/or other network.

In some examples, the wireless signal 488 may be transmitted directly to other wireless devices using sidelink communications (e.g., using a PC5 interface, using a DSRC interface, etc.). Wireless transceivers 478 may be configured to transmit RF signals for performing sidelink communications via antenna 487 in accordance with one or more transmit power parameters that may be associated with one or more regulation modes. Wireless transceivers 478 may also be configured to receive sidelink communication signals having different signal parameters from other wireless devices.

In some examples, the one or more wireless transceivers 478 may include an RF front end including one or more components, such as an amplifier, a mixer (also referred to as a signal multiplier) for signal down conversion, a frequency synthesizer (also referred to as an oscillator) that provides signals to the mixer, a baseband filter, an analog-to-digital converter (ADC), one or more power amplifiers, among other components. The RF front-end may generally handle selection and conversion of the wireless signals 488 into a baseband or intermediate frequency and may convert the RF signals to the digital domain.

In some cases, the computing system 470 may include a coding-decoding device (or CODEC) configured to encode and/or decode data transmitted and/or received using the one or more wireless transceivers 478. In some cases, the computing system 470 may include an encryption-decryption device or component configured to encrypt and/or decrypt data (e.g., according to the AES and/or DES standard) transmitted and/or received by the one or more wireless transceivers 478.

The one or more SIMs 474 may each securely store an international mobile subscriber identity (IMSI) number and related key assigned to the user of the wireless device 407. The IMSI and key may be used to identify and authenticate the subscriber when accessing a network provided by a network service provider or operator associated with the one or more SIMs 474. The one or more modems 476 may modulate one or more signals to encode information for transmission using the one or more wireless transceivers 478. The one or more modems 476 may also demodulate signals received by the one or more wireless transceivers 478 in order to decode the transmitted information. In some examples, the one or more modems 476 may include a Wi-Fi modem, a 4G (or LTE) modem, a 5G (or NR) modem, and/or other types of modems. The one or more modems 476 and the one or more wireless transceivers 478 may be used for communicating data for the one or more SIMs 474.

The computing system 470 may also include (and/or be in communication with) one or more non-transitory machine-readable storage media or storage devices (e.g., one or more memory devices 486), which may include, without limitation, local and/or network accessible storage, a disk drive, a drive array, an optical storage device, a solid-state storage device such as a RAM and/or a ROM, which may be programmable, flash-updateable and/or the like. Such storage devices may be configured to implement any appropriate data storage, including without limitation, various file systems, database structures, and/or the like.

In various embodiments, functions may be stored as one or more computer-program products (e.g., instructions or code) in memory device(s) 486 and executed by the one or more processor(s) 484 and/or the one or more DSPs 482. The computing system 470 may also include software elements (e.g., located within the one or more memory devices 486), including, for example, an operating system, device drivers, executable libraries, and/or other code, such as one or more application programs, which may comprise computer programs implementing the functions provided by various embodiments, and/or may be designed to implement methods and/or configure systems, as described herein.

Figure 5:
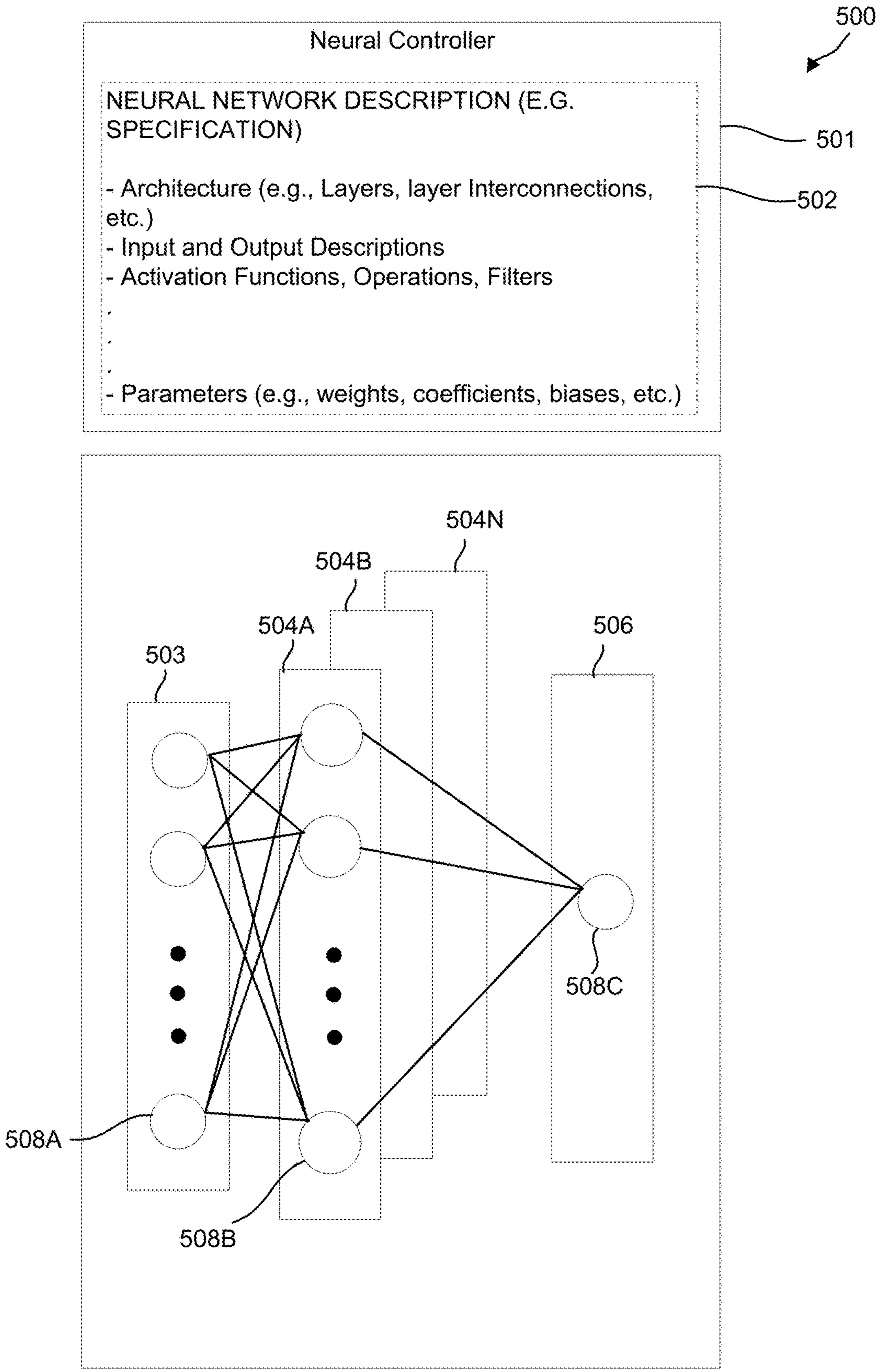
FIG. 5 illustrates an example architecture of a neural network that may be used in accordance with some aspects of the present disclosure.

Increasingly AI/ML algorithms (e.g., AI/ML models, also referred to as ML models) are being incorporated into a variety of technologies including wireless telecommunications standards. One illustrative example of an ML model is a neural network model. FIG. 5 illustrates an example architecture of a neural network 500 that may be used as an example of an ML model in accordance with some aspects of the present disclosure. The example architecture of the neural network 500 may be defined by an example neural network description 502 in neural controller 501. The neural network 500 is an example of a machine learning model that can be deployed and implemented at the base station 102, the central unit (CU) 310, the distributed unit (DU) 330, the radio unit (RU) 340, and/or the UE 104. The neural network 500 can be a feedforward neural network or any other known or to-be-developed neural network or machine learning model.

The neural network description 502 can include a full specification of the neural network 500, including the neural architecture shown in FIG. 5. For example, the neural network description 502 can include a description or specification of architecture of the neural network 500 (e.g., the layers, layer interconnections, number of nodes in each layer, etc.); an input and output description which indicates how the input and output are formed or processed; an indication of the activation functions in the neural network, the operations or filters in the neural network, etc.; neural network parameters such as weights, biases, etc.; and so forth.

The neural network 500 can reflect the neural architecture defined in the neural network description 502. The neural network 500 can include any suitable neural or deep learning type of network. In some cases, the neural network 500 can include a feed-forward neural network. In other cases, the neural network 500 can include a recurrent neural network, which can have loops that allow information to be carried across nodes while reading in input. The neural network 500 can include any other suitable neural network or machine learning model. One example includes a convolutional neural network (CNN), which includes an input layer and an output layer, with multiple hidden layers between the input and out layers. The hidden layers of a CNN include a series of hidden layers as described below, such as convolutional, nonlinear, pooling (for downsampling), and fully connected layers. In other examples, the neural network 500 can represent any other neural or deep learning network, such as an autoencoder, a deep belief nets (DBNs), a recurrent neural network (RNN), a generative-adversarial network (GAN), etc.

In the non-limiting example of FIG. 5, the neural network 500 includes an input layer 503, which can receive one or more sets of input data. The input data can be any type of data (e.g., image data, video data, network parameter data, user data, etc.). The neural network 500 can include hidden layers 504A through 504N (collectively "504" hereinafter). The hidden layers 504 can include n number of hidden layers, where n is an integer greater than or equal to one. The n number of hidden layers can include as many layers as needed for a desired processing outcome and/or rendering intent. In one illustrative example, any one of the hidden layers 504 can include data representing one or more of the data provided at the input layer 503. The neural network 500 further includes an output layer 506 that provides an output resulting from the processing performed by hidden layers 504. The output layer 506 can provide output data based on the input data.

In the example of FIG. 5, the neural network 500 is a multi-layer neural network of interconnected nodes. Each node can represent a piece of information. Information associated with the nodes is shared among the different layers and each layer retains information as information is processed. Information can be exchanged between the nodes through node-to-node interconnections between the various layers. The nodes of the input layer 503 can activate a set of nodes in the first hidden layer 504A. For example, as shown, each input node of the input layer 503 is connected to each node of the first hidden layer 504A. The nodes of the hidden layer 504A can transform the information of each input node by applying activation functions to the information. The information derived from the transformation can then be passed to and can activate the nodes of the next hidden layer (e.g., 504B), which can perform their own designated functions. Example functions include convolutional, up-sampling, data transformation, pooling, and/or any other suitable functions. The output of hidden layer (e.g., 504B) can then activate nodes of the next hidden layer (e.g., 504N), and so on. The output of last hidden layer can activate one or more nodes of the output layer 506, at which point an output can be provided. In some cases, while nodes (e.g., nodes 508A, 508B, 508C) in the neural network 500 are shown as having multiple output lines, a node can have a single output and all lines shown as being output from a node can represent the same output value.

In some cases, each node or interconnection between nodes can have a weight that is a set of parameters derived from training the neural network 500. For example, an interconnection between nodes can represent a piece of information learned about the interconnected nodes. The interconnection can have a numeric weight that can be tuned (e.g., based on a training data set), allowing the neural network 500 to be adaptive to inputs and able to learn as more data is processed.

The neural network 500 can be pre-trained to process the features from the data in the input layer 503 using different hidden layers 504 in order to provide the output through the output layer 506. For example, in some cases, the neural network 500 can adjust weights of nodes using a training process called backpropagation. Backpropagation can include a forward pass, a loss function, a backward pass, and a weight update. The forward pass, loss function, backward pass, and parameter update can be performed for one training iteration. The process can be repeated for a certain number of iterations for each set of training data until the weights of the layers are accurately tuned (e.g., meet a configurable threshold determined based on experiments and/or empirical studies).

Figure 6:
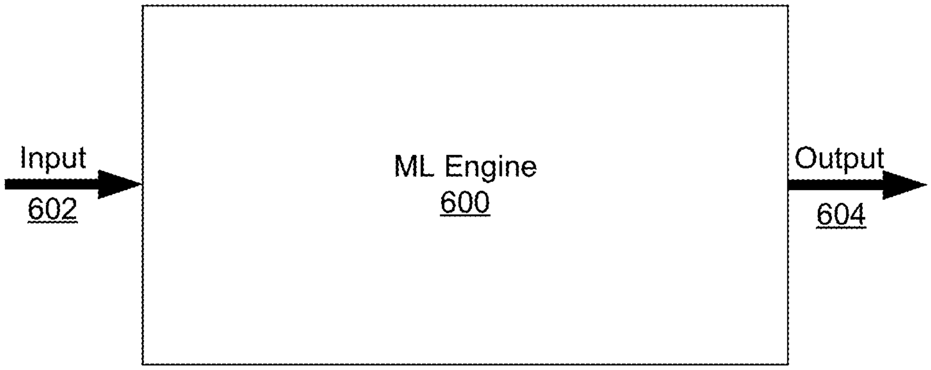
FIG. 6 is a block diagram illustrating an ML engine, in accordance with aspects of the present disclosure.

FIG. 6 is a block diagram illustrating an ML engine 600 that can be used in a wireless communications system, in accordance with aspects of the present disclosure. As an example, one or more devices in a wireless communications system may include the ML engine 600. In some cases, ML engine 600 may be similar to neural network 500. In this example, ML engine 600 includes three parts, input 602 to the ML engine 600, the ML engine, and the output 604 from the ML engine 600. The input 602 to the ML engine 600 may be data from which the ML engine 600 may use to make predictions or otherwise operate on. As an example, an ML engine 600 configured to select an RF beam may take, as input 602, data regarding current RF conditions, location information, network load, etc. As another example, data related to packets sent to a UE, along with historical packet data may be input 602 to an ML engine 600 configured to predict a discontinuous reception (DRX) schedule for the UE. In some cases, the output 604 may be predictions or other information generated by the ML engine 600 and the output 604 may be used to configure a wireless device, adjust settings, parameters, modes of operations, etc. Continuing the previous examples, the ML engine 600 configured to select an RF beam may output 604 a RF beam or set of RF beams that may be used. Similarly, the ML engine 600 configured to predict a DRX schedule for the UE may output a DRX schedule for the UE.

In some cases, various types of control information and/or system information may be generated and/or processed using ML engines, such as ML engine 600. In another example, the ML engine 600 may be an encoder used to compress information (e.g., channel state information (CSI) or channel state feedback (CSF)) determined by a UE in order to generate a representation (e.g., a latent representation) of the information. In some cases, ML models may also be used by network entities to implement operations. In another example, the ML engine 600 may be a decoder used by a network entity (e.g., a base station) to decode a representation (e.g., a latent representation) of the information (e.g., CSI) generated by a UE.

Figure 7:
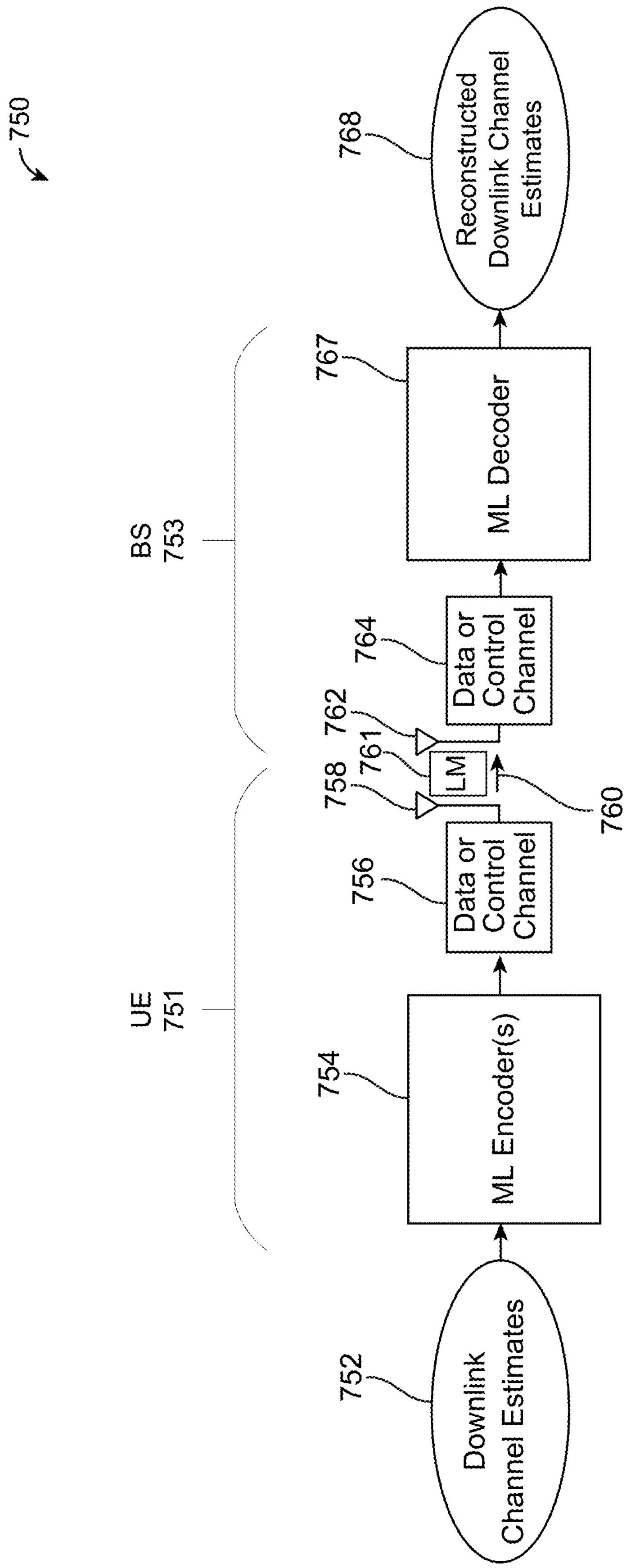
FIG. 7 is a diagram illustrating an example of a network including ML components, in accordance with aspects of the present disclosure.

FIG. 7 is a diagram illustrating an example of a network 750 including a UE 751 and a base station 753 (e.g., a gNB or a portion of a gNB, such as a CU, DU, RU, etc. of a gNB having a disaggregated architecture). As shown in FIG. 7, downlink channel estimates 752 (e.g., CSI or CSF) are provided to an encoder 754 of the UE 751. The CSI encoder 754 encodes the CSI and the UE 751 transmits the encoded CSI (e.g., a latent representation of the CSI as a latent message 761, such as a feature vector representing the CSI) using antenna 758 via a data or control channel 756 over a wireless or air interface 760 to a receiving antenna 762 of the base station 753. In some cases, the UE 751 can transmit a latent message 761 representing the CSI. As noted above, the CSI encoder 754 can replace the PMI codebook which was used to translate the CSI reporting bits to a PMI codeword.

The encoded CSI or latent message 761 is provided via a data or control channel 764 to a CSI decoder 767 of the base station 753 that can decode the encoded CSI to generate a reconstructed downlink channel estimate 768 (or reconstructed CSI). In some cases, the base station 753 can then determine a precoding matrix, a modulation and coding scheme (MCS), and/or a rank associated with one or more antennas of the base station. Based on the precoding matrix, the MCS, and/or the rank, the base station 753 can determine a configuration of control resources (e.g., via a physical downlink control channel (PDCCH)) or data resources (e.g., via a physical downlink shared channel (PDSCH)).

The decoder output could be a number of different data structures. For example, the decoder output could be a downlink channel matrix (H), a transmit covariance matrix, downlink precoders (V), an interference covariance matrix ($R_{nn}$), or a raw vs. whitened downlink channel. In some examples, when the encoder input is (H) (a channel matrix), the decoder output could be H (a channel matrix) or V (an eigen vector) or SV (eigen values times V). When the encoder input is an eigen vector V, the decoder output could be also an eigen vector V. When the encoder input is the inference covariance matrix $R_{nn}$, the output could also be an interference covariance matrix $R_{nn}$. The H or V values can correspond to a raw channel or to a channel pre-whitened by the UE 751 based on its demodulation filter.

As noted above, systems and techniques are described herein for are described herein for providing monitoring for AI/ML functionalities and models. For instance, the systems and techniques provide signaling for providing performance target(s) for AI/ML functionalities (e.g., a gNB transmitting performance target(s) for AI-ML functionalities to a UE) and signaling for providing expected performance for AI/ML models (e.g., a UE transmitting expected performance for each AI/ML model). As previously described, AI/ML features include functionalities. For example, one AI/ML feature can correspond to a single functionality or multiple functionalities. Each functionality can have (or be associated with) one or more AI/ML models (also referred to herein as ML models). Assistance information can be used for AI/ML life cycle management (LCM), such as for functionality/model selection, switching, activation, deactivation, inference, and performance monitoring.

Figure 8:
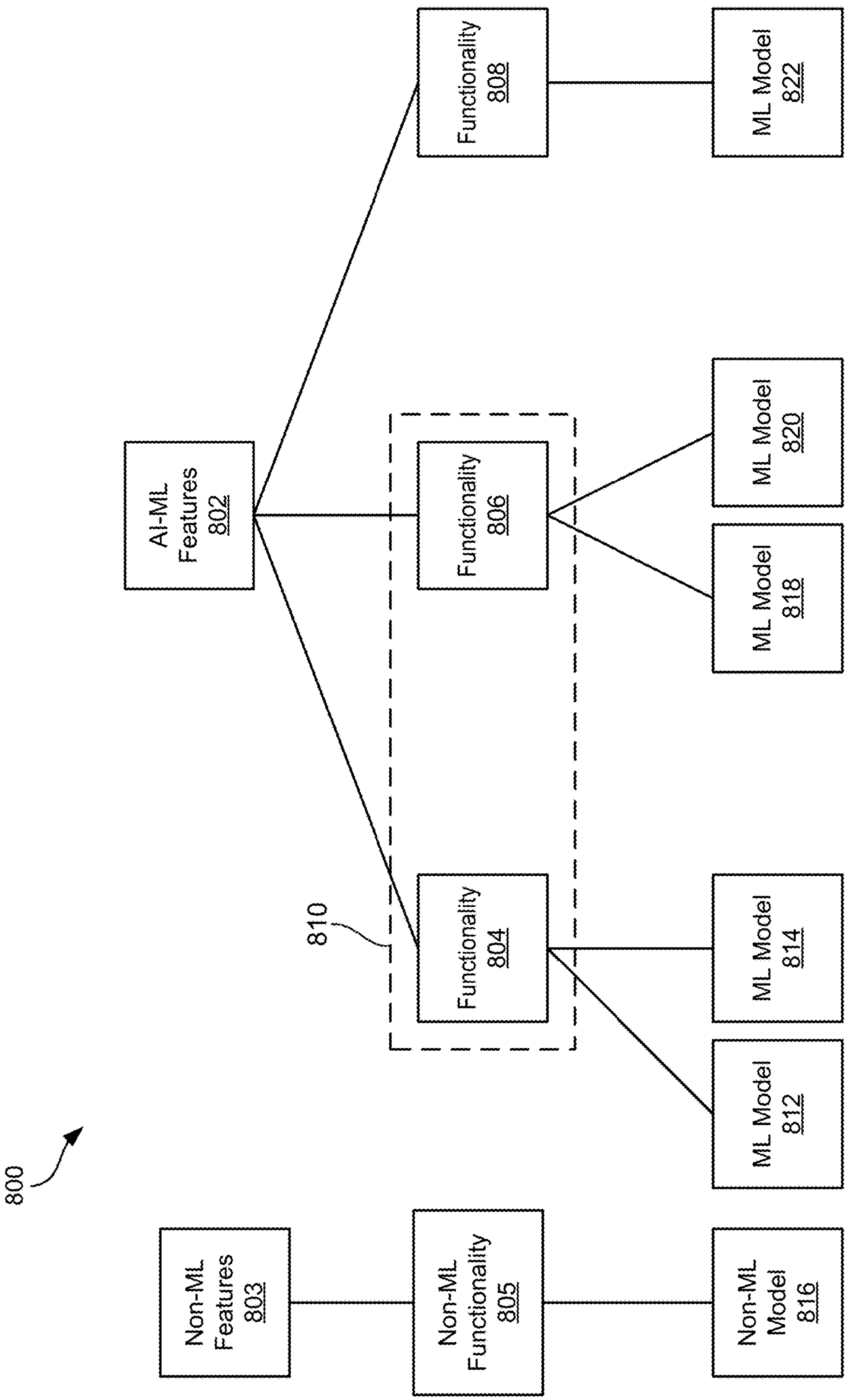
FIG. 8 is a diagram illustrating an example of a dynamic capability indication with respect to features supported by a UE, in accordance with aspects of the present disclosure.

FIG. 8 is a diagram 800 illustrating an example of dynamic capabilities with respect to features supported by a UE in accordance with some aspects of the disclosure. In some case, the UE supports a plurality of AI-ML features 802, which is associated with a first functionality 804, a second functionality 806, and a third functionality 808. The UE can support one or more non-ML features 803 associated with non-ML functionality 805. According to aspects of the disclosure, functionality may be a feature as defined by a 3GPP group or other standard that can have both static and dynamic aspects. There can be many functionalities according to different use cases and/or sub-use cases. Non-limiting examples include spatial beam prediction or temporal beam prediction, CSI prediction, CSI compression.

In some cases, the functionality may be managed by the network (e.g., a network entity such as a gNB), such as relating to communications between UEs and other network entities, network coordination, and so forth. In other cases, the functionality may be managed by UE, such as relating to power control and battery management, UE battery status, computational resources, etc. Any functionality that is proposed and/or adopted by a standards organization that uses the techniques described herein with respect to ML-based models that are used in coordination with a network device is included within the scope of the instant disclosure.

According to aspects of the disclosure, some of the functionality may be related and may be grouped into a functionality group 810. For example, the first functionality 804 and the second functionality 806 may be alternatives and the UE may select one of the first functionality 804 or second functionality 806 based on various contexts. For example, the first functionality 804 and the second functionality 806 may be correlated and may provide fallback or alternative functionality for similar AI-ML features 802.

The fallback functions may be based on context or support. As an example, first functionality 804 may not be supported by the UE based on battery status to preserve battery power, or functionality may be limited based on a setting, such as a setting to limit data transmission in different contexts. An example of fallback functionality on support include a network entities that does not support the first functionality 804, but supports the second functionality 806. In some aspects, the third functionality 808 may not have any correlation to the first functionality 804 and the second functionality 806. The fallback can be utilized to switch from an AI/ML functionality to non-AI/ML functionality.

Each of the first functionality 804, the second functionality 806, and the second functionality 806 include at least one ML model. For example, the first functionality 804 incudes a first ML model 812 and second ML model 814. The second functionality 806 includes a third ML model 818 and a fourth ML model 820, and the third functionality 808 includes a fifth ML model 822. The non-ML functionality 805 includes a non-ML model 816 and in some cases can included multiple non-ML models or algorithms.

In some aspects, the different ML models can be configured to have different performances and complexities that correspond do their corresponding functionality. For example, the first ML model 812 may include a different number of layers than the second ML model 814 and provides higher performance capabilities based on the more complex model. In other cases, the first ML model 812 and the second ML model 814 may have similar performance based on different circumstances. For example, the first ML model 812 may be related to reception under multipath fading conditions and the second ML model 814 is related to intercell interference. In other cases, the first ML model 812 may have lower power consumption at moderate RSSI levels and the second ML model 814 has better performance at the same RSSI levels while consuming more power than the first ML model 812. In this case, the UE prefers the first ML model 812 under ideal situations until the RSSI levels are being impacted by the first ML model 812, and the UE then switches to the second ML model 814 to continue the communication.

In some cases, a non-ML model or algorithm, such as the non-ML model 816 can implement explicit logic rules that consume more power than an ML model. In this case, aspects of the disclosure may use ML-based models to reduce power consumption or more common scenarios and fall back to a non-ML model or algorithm. In some cases, the non-ML model may be excluded and the performance of the functionality can be handled within the ML models, such as the second functionality 806.

The AI-ML features may be implemented in different manners. In a first aspect, the network entity (e.g., an gNB) may be unaware of the ML model and may provide feedback information to the UE regarding LCM of functionality associated with AI-ML features 802. In some aspects, the feedback information may be related to a qualitative value associated with operations of the ML model, and the UE may perform various LCM operations associated with that ML model. For example, as described above, the network entity may provide feedback information to the UE related to the performance of the functionality. In response to the feedback information, the UE may perform an LCM function such as to activate an ML model, deactivate an ML model, switch ML models, or fall back to a non-ML model. The network entity in this aspect provides transparent guidance to the UE, which performs the detailed LCM operations related to the various ML models. Examples of functionality-based LCM are further described in FIG. 9 below.

In a second aspect, the network entity may receive information related to the ML models and provide information related to the LCM of the ML models. The network entity may not have knowledge of the ML models located at the UE and, in this aspect, the network entity can receive information related to the ML model performance and provide feedback information to the UE regarding LCM of functionality associated with the ML model. For example, the network entity can receive an expected performance target associated with an ML model that is being used by the UE, and when the runtime performance of the ML model as determined by the network entity falls below the expected performance target, the network entity may provide feedback information that includes LCM operations. For example, the network entity may provide feedback information for the UE to activate an ML model, switch to a different ML model, fall back to non-ML model, and so forth. Examples of model-based LCM are further described in FIG. 10 below.

In some aspects, the network entity may be configured to concurrently manage the LCM of the functionalities of the UE and the LCM of the ML models.

Figure 9:
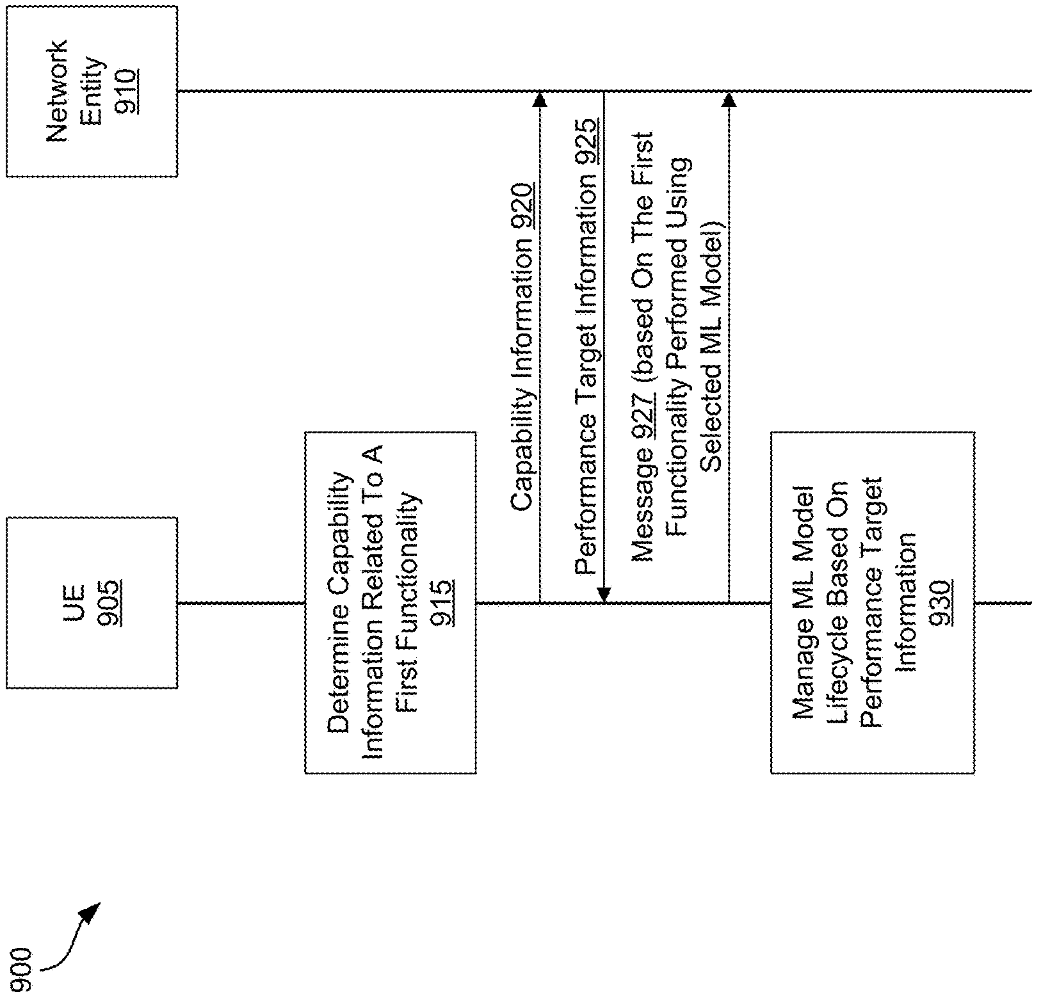
FIG. 9 is a sequence diagram illustrating a method of managing ML models of a UE in accordance with some aspects of the disclosure.

FIG. 9 is a sequence diagram 900 illustrating a method of managing ML models of a UE in accordance with some aspects of the disclosure. In one illustrative aspect, the sequence diagram includes operations related to functionality-based LCM management of ML models based on communication between a UE 905 and a network entity 910.

At block 915, the UE 905 may determine capability information 920 related to a first functionality supported by a set of ML models of the UE. Non-limiting examples of capability information 920 include functionality related to UE-centric operations, network operations, or any other type of operation that is further defined in a standard.

After the UE 905 determines the capability information 920, the UE transmits the capability information 920 to the network entity 910. In some aspects, the capability information 920 may identify at least one functionality that can be provided based on ML functionality. In this case, the capability information 920 does not include specific information related to the ML models and at least includes information that identify functionality supported by the UE. For instance, non-limiting examples of the capability information 920 can include information that identifies spatial and temporal beams for beam management, CSI prediction and compression, positioning related to functions and other suitable type of function.

In some aspects, the capability information 920 may be configured based on conventional logic rules and the UE 905 is configured to report corresponding information. In another illustrative aspect, the standards related to capability information 920 may be defined differently for ML-functions based on performance criteria associated with a test suite. For instance, rather than having a specific set of rules for the UE 905 must comply with, the standard defines a performance criterion based on a test suite and the ML models at the UE can be configured based on a different performance criterion associated with the test suite.

The network entity 910 receives the capability information 920, determines performance target information 925 of the ML models based on the capability information 920, and transmits the performance target information 925 to the UE 905. The network entity 910 in this case is not aware of the ML models being used by the UE 905 and provides performance target information 925 to induce the UE 905 to select a corresponding ML model. In one illustrative aspect, the performance target is associated with the ML model. For example, the performance target comprises at least one of a training loss value associated with a first ML model of the set of ML models, a validation loss value associated with the first ML model, a testing loss associated with the first ML model, or a confidence level of an output of the first ML model.

The UE 905 receives the performance target information 925 and transmits a message 927 based on the first functionality performed using a first ML model selected from the set of ML models. For instance, the UE 905 can transmit the message based on a channel compression provided from the first ML model. In one illustrative example, as described with respect to FIG. 7, the UE 905 can transmit a latent message (e.g., latent message 761) representing CSI.

At block 930, the UE 905 manages LCM operations of the ML models based on the performance target information 925. In some aspects, the LCM operations may include monitoring performance for a first ML model of the set of ML models based on information collected at the UE or received from the network entity. In another aspect, the LCM operations may include monitoring performance for at least one inactive ML model of the set of ML models associated with the first functionality. In some aspects, the ML models can be related to control plane functionality or user plane functionality. Non-limiting examples of control plane functionality include RRC management, session management, dynamic spectrum utilization, and mobility management. Non-limiting examples of user plane functionality include QoS functionality, header compression, error handling, data compression, modulation, encoding, and dynamic spectrum utilization.

According to various aspect, the performance target may be associated with the first functionality, such as whether the first functionality satisfies the performance target related to training, validation, and/or test metrics. For example, the performance target may be determined based on a performance of each ML model of the set of ML models associated with the first functionality satisfy the performance target. In another example, the performance target may be determined based on an average performance of all ML models of the set of ML models associated with the first functionality satisfy the performance target.

In some aspects, the performance of the ML model can be monitored by the UE 905 or the network entity 910. In one illustrative aspect, the UE 905 can be aware of the expected performance of an active ML model being used in an active functionality with the network entity 910, and the determine that a loss associated with the runtime performance differs from an expected performance, which is determined during development and/or training of that particular ML model. The network entity 910 can be configured to detect losses as well, such as a bit or frame error rate between the UE 905 and the network entity 910, that indicate that an active model is not functioning within normal tolerances. To that end, the network entity 910 can provide information related to performance target information 925 to cause the UE 905 to perform various LCM functions, such as switching to a different functionality. In another aspect, the network entity 910 can provide information related to the performance target information 925 to cause the UE 905 to perform various LCM function to switch functionality or change ML models. For example, the UE 905 may fall back to a logic-based rule module such as non-ML model 816.

As described above, the sequence diagram 900 illustrates functionality-based control of the ML models. The network entity 910 is unaware of the ML models and transparently provides feedback information to assist the UE 905 for managing LCM of the various LCM models therein.

Figure 10:
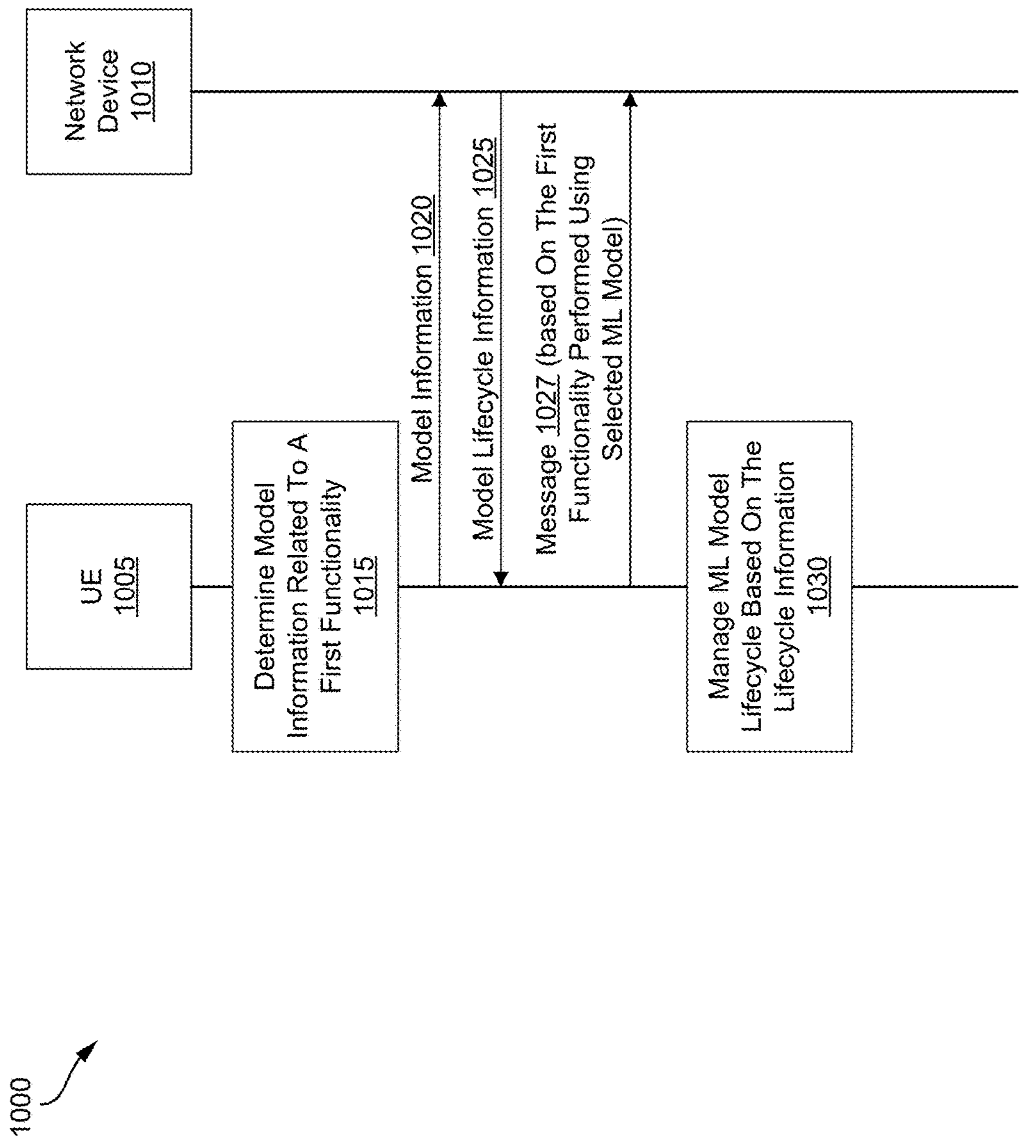
FIG. 10 is a sequence diagram illustrating a method of managing ML models of a UE in accordance with some aspects of the disclosure.

FIG. 10 is a sequence diagram 1000 illustrating a method of managing ML models of a UE in accordance with some aspects of the disclosure. In one illustrative aspect, the sequence diagram includes operations related to model ID-based LCM management of ML models based on communication between a UE 1005 and a network entity 1010.

In the illustrative aspect of FIG. 10, the UE 1005 is configured to determine ML model information 1015 related to a first functionality. For example, the UE 1005 may identify each ML model associated supported for a particular functionality and provide the model information to the network entity 1010. In another example, the UE 1005 may identify each ML model supported by the UE 1005 and provide the information to the network entity 1010.

The UE 1005 transmits model information 1020 to the network entity 1010 for registering or identifying each ML model of the UE 1005 with the network entity 1010. The model information 1020 may include expected performance information of each ML model. In response to the model information 1020, the network entity 1010 determines an ML model associated with at least one functionality and sends model lifecycle information 1025 to the UE 1005. For example, the model lifecycle information 1025 can include information to at least one of activate a first ML model, deactivate the first ML model, select a second ML model, activate the second ML model in place of the first ML model, or activate non-ML model (e.g., implementing rule-based logic) to perform the first functionality based on the lifecycle information.

The UE 1005 transmits a message 1027 based on the first functionality performed using a first ML model selected from the set of ML models. For instance, the UE 905 can transmit the message based on a channel compression provided from the first ML model. In one illustrative example, as described with respect to FIG. 7, the UE 905 can transmit a latent message (e.g., latent message 761) representing CSI.

At block 930, the UE 1005 manages the LCM of at least one ML model associated with at least one functionality based on the lifecycle information. In some aspects, the UE can activate, deactivate, and/or switch ML models, or may fall back to non-ML model (e.g., performing a rule-based operation). In some aspects, the ML models can be related to control plane functionality or user plane functionality. Non-limiting examples of control plane functionality include RRC management, session management, dynamic spectrum utilization, and mobility management. Non-limiting examples of user plane functionality include QoS functionality, header compression, error handling, data compression, modulation, encoding, and dynamic spectrum utilization.

Figure 11:
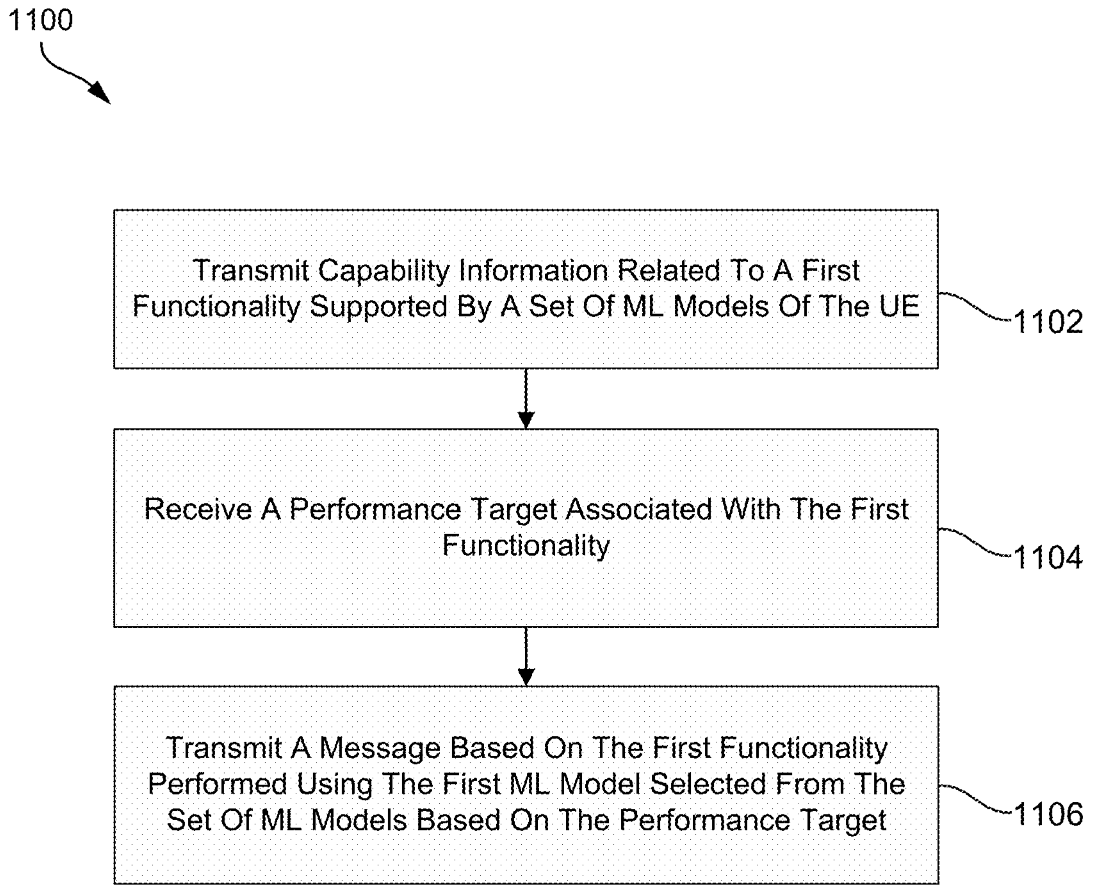
FIG. 11 is a flow diagram illustrating an example of a process for wireless communication, in accordance with aspects of the present disclosure.

FIG. 11 is a flow diagram illustrating a process 1100 for performing wireless communications. The process 1100 can be performed by a wireless device, such as a UE (e.g., UE 104 of FIG. 1, UE 751 of FIG. 7, the UEs of FIG. 8, FIG. 9, and/or FIG. 10, etc.), or by a component or system (e.g., a chipset) of the wireless device. The wireless device may be a mobile device (e.g., a mobile phone), a network-connected wearable such as a watch, an extended reality (XR) device such as a virtual reality (VR) device or augmented reality (AR) device, a vehicle or component or system of a vehicle, or other type of computing device. The operations of the process 1100 may be implemented as software components that are executed and run on one or more processors (e.g., one or more of the processors of the UE 104 of FIG. 2, processor 484 of FIG. 4, processor 1310 of FIG. 13, and/or other processor(s)). Further, the transmission and reception of signals by the wireless device in the process 1100 may be enabled, for example, by one or more antennas (e.g., antennas 252 of FIG. 2, antenna 487 of FIG. 4, etc.) and/or one or more transceivers (e.g., wireless transceiver(s) 478 of FIG. 4, the communication interface 1340 of FIG. 13, etc.).

At block 1102, the computing device (or component thereof) can transmit (or output for transmission), to a network entity, capability information related to a first functionality supported by a set of ML models of the UE.

At block 1104, the computing device (or component thereof) can receive, from the network entity, a performance target associated with the first functionality. In one aspect, the performance target associated with the first functionality may include plurality of performance targets associated with the first functionality. In some cases, the plurality of performance targets are based on different complexities associated with different ML models (e.g., the plurality of performance targets are based on a plurality of ML models associated with different complexities, performances such as low or high accuracies). For example, the UE may include different models corresponding to different complexities, and the UE may select a model based on the performance target.

At block 1106, the computing device (or component thereof) can transmit (e.g., via a transceiver), to the network entity, a message based on the first functionality performed using a first ML model selected from the set of ML models based on the performance target. In one illustrative example, the message can be transmitted based on a channel compression (e.g., CSI compression) provided from the first ML model. In some aspects, the first functionality comprises spatial beam prediction, temporal beam prediction, channel prediction, channel compression prediction, any combination thereof, and/or other functionality. In other aspects, the first functionality can be related to control plane functionality or user plane functionality. Non-limiting examples of control plane functionality include RRC management, session management, dynamic spectrum utilization, and mobility management. Non-limiting examples of user plane functionality include QoS functionality, header compression, error handling, data compression, modulation, encoding, and dynamic spectrum utilization.

In some aspects, after receiving the performance target, the UE may perform the first functionality using a first ML model selected from the set of ML models based on the performance target.

In one aspect, the UE may determine whether at least one ML model of the set of ML models (or performance or training of the set of ML models) associated with the first functionality satisfies the performance target related to training, validation, and/or test metrics. For example, the performance target can be related to a confidence level. The determining of the performance can include determining a performance of each ML model of the set of ML models associated with the first functionality satisfy the performance target. In another example, the determining of the performance can determine an average performance of all ML models of the set of ML models associated with the first functionality satisfy the performance target.

The UE may also be configured to monitor a performance of a first ML model of the set of ML models based on information collected at the UE or received from the network entity. In another example, the UE may monitor runtime performance for at least one inactive ML model of the set of ML models associated with the first functionality. According to various aspects, the UE may perform at least one of activating the first functionality, deactivating the first functionality, or switching to a second functionality in place of the first functionality based on the performance target. According to various aspects, the UE may perform at least one of activating a first ML model of the set of ML models, deactivating the first ML model, selecting a second ML model to achieve the performance target, activating the second ML model in place of the first ML model, or activating a non-ML model to perform the first functionality based on the performance target.

As described above, the performance target may comprise at least one of a training loss value associated with a first ML model of the set of ML models, a validation loss value associated with the first ML model, a testing loss associated with the first ML model, or a confidence level of an output of the first ML model.

According to various aspects, the capability information can include ML model information identifying at least one ML model associated with the first functionality supported by the UE.

In some aspects, the network entity can be configured to manage the lifecycles of the ML models, in conjunction or disjunction with the lifecycle management of the functionality described above. For example, the ML model information may at least have one identifier associated with a first ML model and an expected performance associated with the first ML model.

In one illustrative aspect, the UE may monitor a performance of the first ML model based on information collected at the UE. For example, the UE may perform at least one of activating the first ML model based on the expected performance, deactivating the first ML model based on the performance of the first ML model, selecting a second ML model to achieve the performance target, activating the second ML model in place of the first ML model, or activating a non-ML model to perform the first functionality.

The UE can also receive information of a first ML model of the set of ML models associated with the first functionality from the network entity. For example, the UE may perform at least one of activating the first ML model, deactivating the first ML model, selecting a second ML model, activating the second ML model in place of the first ML model, or activating a non-ML model to perform the first functionality based on the information of the first ML model.

According to some aspects, the UE may train at least one ML model and may include training at least one ML model of the set of ML models based on one or more ML model parameters, data for training the at least one ML model, and a functionality performance target. The UE may obtain an expected performance associated with the first functionality based on the training of the at least one ML model, wherein a value of the expected performance is greater than a value of the functionality performance target. The at least one ML model may be trained by at least one of the network entity or another network entity in communication with the UE.

Figure 12:
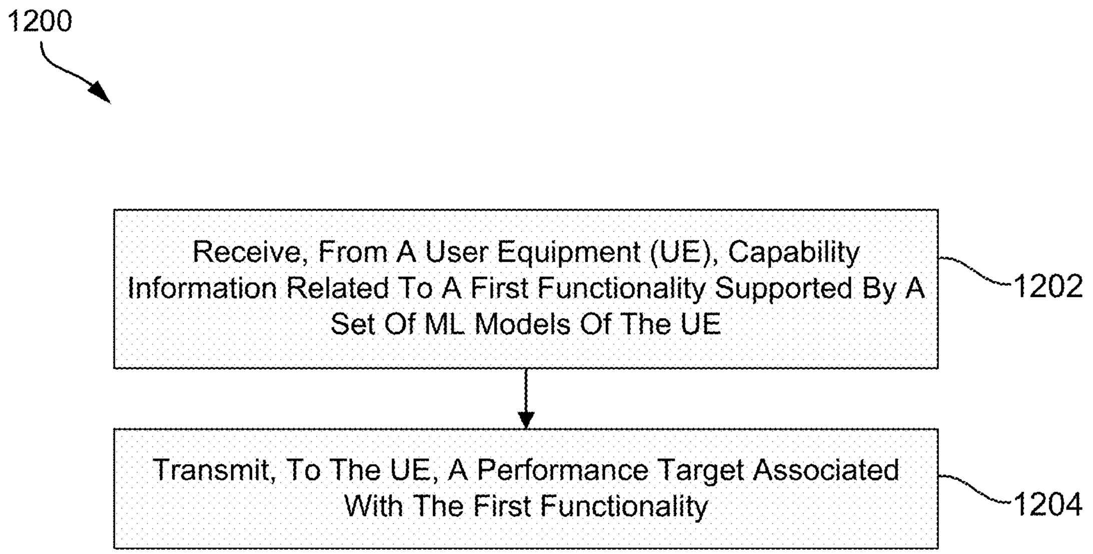
FIG. 12 is a flow diagram illustrating another example of a process for wireless communication, in accordance with aspects of the present disclosure.

FIG. 12 is a flow diagram illustrating a process 1200 for performing wireless communications. The process 1200 can be performed by a network entity (e.g., base station 102 of FIG. 1 and/or FIG. 2, disaggregated base station 300 of FIG. 3, etc.) or by a component or system (e.g., a chipset) of the network entity. The operations of the process 1100 may be implemented as software components that are executed and run on one or more processors (e.g., one or more of the processors of the base station 102 of FIG. 2, processor 1310 of FIG. 13, and/or other processor(s)). Further, the transmission and reception of signals by the network entity in the process 1100 may be enabled, for example, by one or more antennas (e.g., antennas 252 of FIG. 2, antenna 487 of FIG. 4, etc.) and/or one or more transceivers (e.g., wireless transceiver(s) 478 of FIG. 4, the communication interface 1340 of FIG. 13, etc.).

At block 1202, the computing device (or component thereof) can receive, from a UE, capability information related to a first functionality supported by a set of ML models of the UE. Various aspects of capability information are described above in relation to FIG. 11, as well as other aspects described herein.

Figure 13:
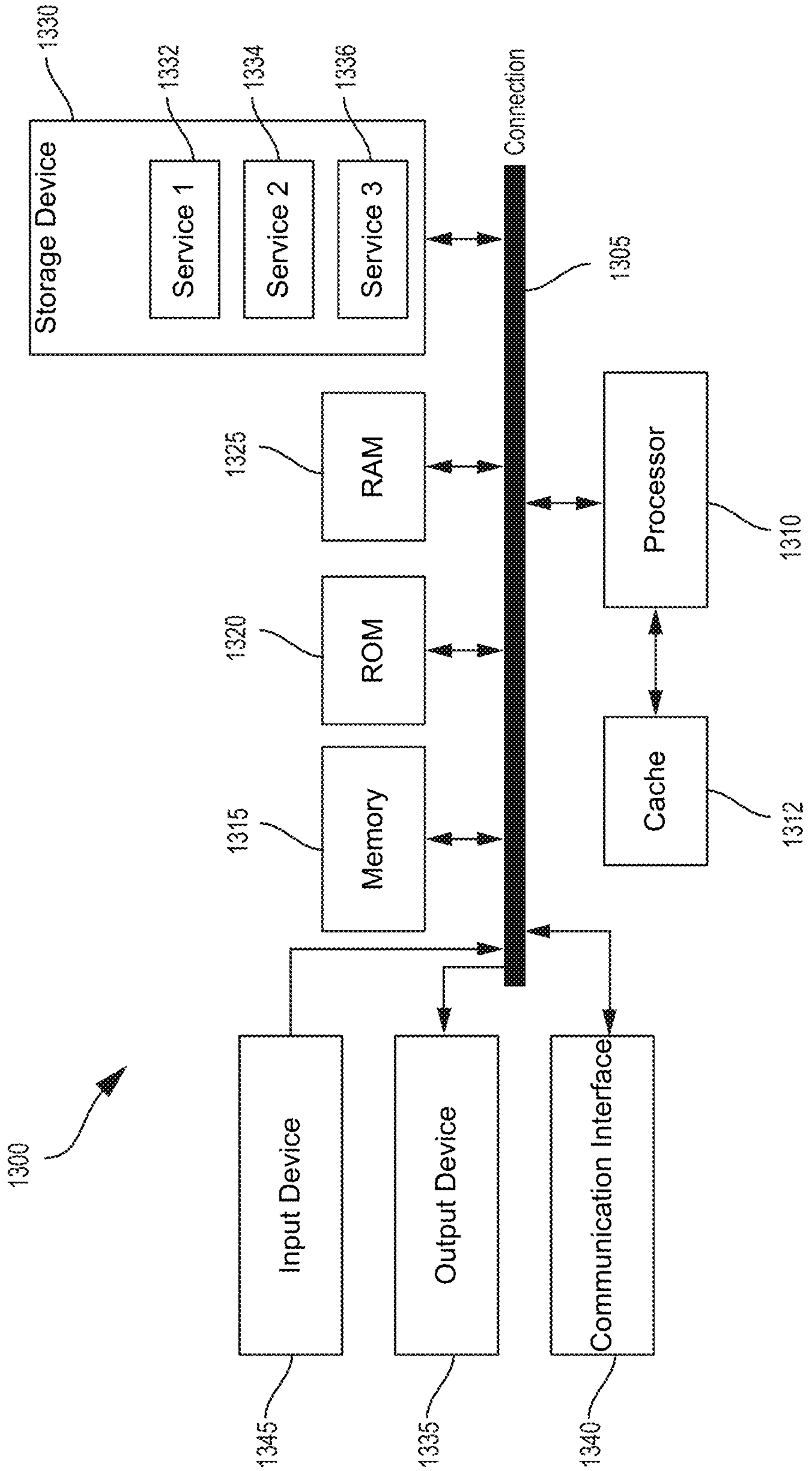
FIG. 13 is a diagram illustrating an example of a system for implementing certain aspects of the present technology.

At block 1204, the computing device transmit a performance target associated with the first functionality. Various aspects of the performance target are described above in relation to FIG. 11, as well as other aspects described herein. In some cases, the performance target can be related to ML models (e.g., model-based LCM) and/or functionality (e.g., functionality-based LCM). In one illustrative aspect, the computing device may activate the first functionality at the UE, deactivate the first functionality at the UE, or switch to a second functionality in place of the first functionality based on the performance target FIG. 13 is a diagram illustrating an example of a system for implementing certain aspects of the present technology. In particular, FIG. 13 illustrates an example of computing system 1300, which may be for example any computing device making up internal computing system, a remote computing system, a camera, or any component thereof in which the components of the system are in communication with each other using connection 1305. Connection 1305 may be a physical connection using a bus, or a direct connection into processor 1310, such as in a chipset architecture. Connection 1305 may also be a virtual connection, networked connection, or logical connection.

In some embodiments, computing system 1300 is a distributed system in which the functions described in this disclosure may be distributed within a datacenter, multiple data centers, a peer network, etc. In some embodiments, one or more of the described system components represents many such components each performing some or all of the function for which the component is described. In some embodiments, the components may be physical or virtual devices.

Example system 1300 includes at least one processing unit (CPU or processor) 1310 and connection 1305 that communicatively couples various system components including system memory 1315, such as read-only memory (ROM) 1320 and random access memory (RAM) 1325 to processor 1310. Computing system 1300 may include a cache 1312 of high-speed memory connected directly with, in close proximity to, or integrated as part of processor 1310.

Processor 1310 may include any general purpose processor and a hardware service or software service, such as services 1332, 1334, and 1336 stored in storage device 1330, configured to control processor 1310 as well as a special-purpose processor where software instructions are incorporated into the actual processor design. Processor 1310 may essentially be a completely self-contained computing system, containing multiple cores or processors, a bus, memory controller, cache, etc. A multi-core processor may be symmetric or asymmetric.

To enable user interaction, computing system 1300 includes an input device 1345, which may represent any number of input mechanisms, such as a microphone for speech, a touch-sensitive screen for gesture or graphical input, keyboard, mouse, motion input, speech, etc. Computing system 1300 may also include output device 1335, which may be one or more of a number of output mechanisms. In some instances, multimodal systems may enable a user to provide multiple types of input/output to communicate with computing system 1300.

Computing system 1300 may include communication interface 1340, which may generally govern and manage the user input and system output. The communication interface may perform or facilitate receipt and/or transmission wired or wireless communications using wired and/or wireless transceivers, including those making use of an audio jack/plug, a microphone jack/plug, a universal serial bus (USB) port/plug, an Apple™ Lightning™ port/plug, an Ethernet port/plug, a fiber optic port/plug, a proprietary wired port/plug, 3G, 4G, 5G and/or other cellular data network wireless signal transfer, a Bluetooth™ wireless signal transfer, a Bluetooth™ low energy (BLE) wireless signal transfer, an IBEACON™ wireless signal transfer, a radio-frequency identification (RFID) wireless signal transfer, near-field communications (NFC) wireless signal transfer, dedicated short range communication (DSRC) wireless signal transfer, 802.11 Wi-Fi wireless signal transfer, wireless local area network (WLAN) signal transfer, Visible Light Communication (VLC), Worldwide Interoperability for Microwave Access (WiMAX), Infrared (IR) communication wireless signal transfer, Public Switched Telephone Network (PSTN) signal transfer, Integrated Services Digital Network (ISDN) signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof. The communication interface 1340 may also include one or more Global Navigation Satellite System (GNSS) receivers or transceivers that are used to determine a location of the computing system 1300 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 1330 may be a non-volatile and/or non-transitory and/or computer-readable memory device and may be a hard disk or other types of computer readable media which may store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a compact disc read only memory (CD-ROM) optical disc, a rewritable compact disc (CD) optical disc, digital video disk (DVD) optical disc, a blu-ray disc (BDD) optical disc, a holographic optical disk, another optical medium, a secure digital (SD) card, a micro secure digital (microSD) card, a Memory Stick® card, a smartcard chip, a EMV chip, a subscriber identity module (SIM) card, a mini/micro/nano/pico SIM card, another integrated circuit (IC) chip/card, random access memory (RAM), static RAM (SRAM), dynamic RAM (DRAM), read-only memory (ROM), programmable read-only memory (PROM), erasable programmable read-only memory (EPROM), electrically erasable programmable read-only memory (EEPROM), flash EPROM (FLASHEPROM), cache memory (e.g., Level 1 (L1) cache, Level 2 (L2) cache, Level 3 (L3) cache, Level 4 (L4) cache, Level 5 (L5) cache, or other (L #) cache), resistive random-access memory (RRAM/ReRAM), phase change memory (PCM), spin transfer torque RAM (STT-RAM), another memory chip or cartridge, and/or a combination thereof.

The storage device 1330 may include software services, servers, services, etc., that when the code that defines such software is executed by the processor 1310, it causes the system to perform a function. In some embodiments, a hardware service that performs a particular function may include the software component stored in a computer-readable medium in connection with the necessary hardware components, such as processor 1310, connection 1305, output device 1335, etc., to carry out the function. The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data may be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

Specific details are provided in the description above to provide a thorough understanding of the embodiments and examples provided herein, but those skilled in the art will recognize that the application is not limited thereto. Thus, while illustrative embodiments of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, embodiments may be utilized in any number of environments and applications beyond those described herein without departing from the broader scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

For clarity of explanation, in some instances the present technology may be presented as including individual functional blocks including devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

Individual embodiments may be described above as a process or method which is depicted as a flowchart, a flow diagram, a data flow diagram, a structure diagram, or a block diagram. Although a flowchart may describe the operations as a sequential process, many of the operations may be performed in parallel or concurrently. In addition, the order of the operations may be re-arranged. A process is terminated when its operations are completed but could have additional steps not included in a figure. A process may correspond to a method, a function, a procedure, a subroutine, a subprogram, etc. When a process corresponds to a function, its termination may correspond to a return of the function to the calling function or the main function.

Processes and methods according to the above-described examples may be implemented using computer-executable instructions that are stored or otherwise available from computer-readable media. Such instructions may include, for example, instructions and data which cause or otherwise configure a general purpose computer, special purpose computer, or a processing device to perform a certain function or group of functions. Portions of computer resources used may be accessible over a network. The computer executable instructions may be, for example, binaries, intermediate format instructions such as assembly language, firmware, source code. Examples of computer-readable media that may be used to store instructions, information used, and/or information created during methods according to described examples include magnetic or optical disks, flash memory, USB devices provided with non-volatile memory, networked storage devices, and so on.

In some embodiments the computer-readable storage devices, mediums, and memories may include a cable or wireless signal containing a bitstream and the like. However, when mentioned, non-transitory computer-readable storage media expressly exclude media such as energy, carrier signals, electromagnetic waves, and signals per se.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof, in some cases depending in part on the particular application, in part on the desired design, in part on the corresponding technology, etc.

The various illustrative logical blocks, modules, and circuits described in connection with the aspects disclosed herein may be implemented or performed using hardware, software, firmware, middleware, microcode, hardware description languages, or any combination thereof, and may take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Examples of form factors include laptops, smart phones, mobile phones, tablet devices or other small form factor personal computers, personal digital assistants, rackmount devices, standalone devices, and so on. Functionality described herein also may be embodied in peripherals or add-in cards. Such functionality may also be implemented on a circuit board among different chips or different processes executing in a single device, by way of further example.

The instructions, media for conveying such instructions, computing resources for executing them, and other structures for supporting such computing resources are example means for providing the functions described in the disclosure.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium including program code including instructions that, when executed, performs one or more of the methods, algorithms, and/or operations described above. The computer-readable data storage medium may form part of a computer program product, which may include packaging materials. The computer-readable medium may include memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that may be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general-purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term “processor,” as used herein may refer to any of the foregoing structure, any combination of the foregoing structure, or any other structure or apparatus suitable for implementation of the techniques described herein.

One of ordinary skill will appreciate that the less than (“<”) and greater than (“>”) symbols or terminology used herein may be replaced with less than or equal to (“≤”) and greater than or equal to (“≥”) symbols, respectively, without departing from the scope of this description.

Where components are described as being “configured to” perform certain operations, such configuration may be accomplished, for example, by designing electronic circuits or other hardware to perform the operation, by programming programmable electronic circuits (e.g., microprocessors, or other suitable electronic circuits) to perform the operation, or any combination thereof.

The phrase “coupled to” or “communicatively coupled to” refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting “at least one of” a set and/or “one or more” of a set indicates that one member of the set or multiple members of the set (in any combination) satisfy the claim. For example, claim language reciting “at least one of A and B” or “at least one of A or B” means A, B, or A and B. In another example, claim language reciting “at least one of A, B, and C” or “at least one of A, B, or C” means A, B, C, or A and B, or A and C, or B and C, A and B and C, or any duplicate information or data (e.g., A and A, B and B, C and C, A and A and B, and so on), or any other ordering, duplication, or combination of A, B, and C. The language “at least one of” a set and/or “one or more”

of a set does not limit the set to the items listed in the set. For example, claim language reciting "at least one of A and B" or "at least one of A or B" may mean A, B, or A and B, and may additionally include items not listed in the set of A and B. The phrases "at least one" and "one or more" are used interchangeably herein.

Claim language or other language reciting "at least one processor configured to," "at least one processor being configured to," "one or more processors configured to," "one or more processors being configured to," or the like indicates that one processor or multiple processors (in any combination) can perform the associated operation(s). For example, claim language reciting "at least one processor configured to: X, Y, and Z" means a single processor can be used to perform operations X, Y, and Z; or that multiple processors are each tasked with a certain subset of operations X, Y, and Z such that together the multiple processors perform X, Y, and Z; or that a group of multiple processors work together to perform operations X, Y, and Z. In another example, claim language reciting "at least one processor configured to: X, Y, and Z" can mean that any single processor may only perform at least a subset of operations X, Y, and Z.

Where reference is made to one or more elements performing functions (e.g., steps of a method), one element may perform all functions, or more than one element may collectively perform the functions. When more than one element collectively performs the functions, each function need not be performed by each of those elements (e.g., different functions may be performed by different elements) and/or each function need not be performed in whole by only one element (e.g., different elements may perform different sub-functions of a function). Similarly, where reference is made to one or more elements configured to cause another element (e.g., an apparatus) to perform functions, one element may be configured to cause the other element to perform all functions, or more than one element may collectively be configured to cause the other element to perform the functions.

Where reference is made to an entity (e.g., any entity or device described herein) performing functions or being configured to perform functions (e.g., steps of a method), the entity may be configured to cause one or more elements (individually or collectively) to perform the functions. The one or more components of the entity may include at least one memory, at least one processor, at least one communication interface, another component configured to perform one or more (or all) of the functions, and/or any combination thereof. Where reference to the entity performing functions, the entity may be configured to cause one component to perform all functions, or to cause more than one component to collectively perform the functions. When the entity is configured to cause more than one component to collectively perform the functions, each function need not be performed by each of those components (e.g., different functions may be performed by different components) and/or each function need not be performed in whole by only one component (e.g., different components may perform different sub-functions of a function).

Illustrative aspects of the disclosure include:

Aspect 1. An apparatus for wireless communications, the apparatus comprising: at least memory; and at least one processor coupled to the at least memory and configured to: output, for transmission to a network entity, capability information related to a first functionality supported by a set of machine learning (ML) models of the apparatus; and receive, from the network entity, a performance target associated with the first functionality.

Aspect 2. The apparatus of Aspect 1, wherein the at least one processor is configured to perform the first functionality using a first ML model selected from the set of ML models based on the performance target.

Aspect 3. The apparatus of any one of Aspects 1 or 2, wherein the at least one processor is configured to transmit a message based on the first functionality performed using a first ML model selected from the set of ML models based on the performance target.

Aspect 4. The apparatus of any one of Aspects 1 to 3, wherein the at least one processor is configured to receive a plurality of performance targets associated with the first functionality.

Aspect 5. The apparatus of Aspect 4, wherein the plurality of performance targets are based on a different complexities associated with different ML models.

Aspect 6. The apparatus of any one of Aspects 1 to 5, wherein the at least one processor is configured to: determine whether at least one ML model of the set of ML models associated with the first functionality satisfies the performance target related to at least one of training, validation, or test metrics.

Aspect 7. The apparatus of Aspect 6, wherein the at least one processor is configured to: determine a performance of each ML model of the set of ML models associated with the first functionality satisfy the performance target.

Aspect 8. The apparatus of Aspect 6, wherein the at least one processor is configured to: determine an average performance of all ML models of the set of ML models associated with the first functionality satisfy the performance target.

Aspect 9. The apparatus of any one of Aspects 1 to 8, wherein the at least one processor is configured to: monitor a performance of a first ML model of the set of ML models based on information collected at the apparatus or received from the network entity.

Aspect 10. The apparatus of any one of Aspects 1 to 9, wherein the at least one processor is configured to: monitor a performance of at least one inactive ML model of the set of ML models associated with the first functionality.

Aspect 11. The apparatus of any one of Aspects 1 to 10, wherein the at least one processor is configured to at least one of activate the first functionality, deactivate the first functionality, or switch to a second functionality in place of the first functionality based on the performance target.

Aspect 12. The apparatus of any one of Aspects 1 to 11, wherein the at least one processor is configured to at least one of activate a first ML model of the set of ML models, deactivate the first ML model, select a second ML model to achieve the performance target, activate the second ML model in place of the first ML model, or activate a non-ML model to perform the first functionality based on the performance target.

Aspect 13. The apparatus of any one of Aspects 1 to 12, wherein the performance target comprises at least one of a training loss value associated with a first ML model of the set of ML models, a validation loss value associated with the first ML model, a testing loss associated with the first ML model, or a confidence level of an output of the first ML model.

Aspect 14. The apparatus of any one of Aspects 1 to 13, wherein the capability information comprises ML model information identifying at least one ML model associated with the first functionality supported by the apparatus.

Aspect 1514. The apparatus of Aspect 14, wherein the ML model information comprises at least one identifier associated with a first ML model and an expected performance associated with the first ML model.

Aspect 16. The apparatus of Aspect 15, wherein the at least one processor is configured to: monitor a performance of the first ML model based on information collected at the apparatus.

Aspect 17. The apparatus of Aspect 16, wherein the at least one processor is configured to at least one of activate the first ML model based on the expected performance, deactivate the first ML model based on the performance of the first ML model, select a second ML model to achieve the performance target, activate the second ML model in place of the first ML model, or activate a non-ML model to perform the first functionality.

Aspect 18. The apparatus of any one of Aspects 1 to 17, wherein the at least one processor is configured to: receive, from the network entity, information of a first ML model of the set of ML models associated with the first functionality.

Aspect 19. The apparatus of Aspect 18, wherein the at least one processor is configured to at least one of activate the first ML model, deactivate the first ML model, select a second ML model, activate the second ML model in place of the first ML model, or activate a non-ML model to perform the first functionality based on the information of the first ML model.

Aspect 20. The apparatus of any one of Aspects 1 to 19, wherein the at least one processor is configured to: train at least one ML model of the set of ML models based on one or more ML model parameters, data for training the at least one ML model, and a functionality performance target.

Aspect 21. The apparatus of Aspect 20, wherein the at least one processor is configured to: obtain an expected performance associated with the first functionality based on the training of the at least one ML model, wherein a value of the expected performance is greater than a value of the functionality performance target.

Aspect 22. The apparatus of any one of Aspects 1 to 20, wherein at least one ML model of the set of ML models is trained by at least one of the network entity or another network entity in communication with the apparatus.

Aspect 23. A method of wireless communications at a user equipment (UE), the method comprising: transmitting, to a network entity, capability information related to a first functionality supported by a set of machine learning (ML) models of the UE; and receiving, from the network entity, a performance target associated with the first functionality.

Aspect 24. The method of Aspect 23, further comprising performing the first functionality using a first ML model selected from the set of ML models based on the performance target.

Aspect 25. The apparatus of any one of Aspects 23 or 24, further comprising transmitting a message based on the first functionality performed using a first ML model selected from the set of ML models based on the performance target.

Aspect 26. The method of any one of Aspects 23 to 25, wherein receiving the performance target comprises receiving a plurality of performance targets associated with the first functionality.

Aspect 27. The method of Aspect 26, wherein the plurality of performance targets are based on different complexities associated with different ML models.

Aspect 28. The method of any one of Aspects 23 to 27, further comprising: determining whether at least one ML model of the set of ML models associated with the first functionality satisfies the performance target related to at least one of training, validation, or test metrics.

Aspect 29. The method of Aspect 28, further comprising: determining a performance of each ML model of the set of ML models associated with the first functionality satisfy the performance target.

Aspect 30. The method of Aspect 28, further comprising: determining an average performance of all ML models of the set of ML models associated with the first functionality satisfy the performance target.

Aspect 31. The method of any one of Aspects 23 to 30, further comprising: monitoring a performance of a first ML model of the set of ML models based on information collected at the UE or received from the network entity.

Aspect 32. The method of any one of Aspects 23 to 31, further comprising: monitoring a performance of at least one inactive ML model of the set of ML models associated with the first functionality.

Aspect 33. The method of any one of Aspects 23 to 32, further comprising at least one of activating the first functionality, deactivating the first functionality, or switching to a second functionality in place of the first functionality based on the performance target.

Aspect 34. The method of any one of Aspects 23 to 33, further comprising at least one of activating a first ML model of the set of ML models, deactivating the first ML model, selecting a second ML model to achieve the performance target, activating the second ML model in place of the first ML model, or activating a non-ML model to perform the first functionality based on the performance target.

Aspect 35. The method of any one of Aspects 23 to 34, wherein the performance target comprises at least one of a training loss value associated with a first ML model of the set of ML models, a validation loss value associated with the first ML model, a testing loss associated with the first ML model, or a confidence level of an output of the first ML model.

Aspect 36. The method of any one of Aspects 23 to 35, wherein the capability information comprises ML model information identifying at least one ML model associated with the first functionality supported by the UE.

Aspect 37. The method of Aspect 36, wherein the ML model information comprises at least one identifier associated with a first ML model and an expected performance associated with the first ML model.

Aspect 38. The method of Aspect 37, further comprising: monitoring a performance of the first ML model based on information collected at the UE.

Aspect 39. The method of Aspect 38, further comprising at least one of activating the first ML model based on the expected performance, deactivating the first ML model based on the performance of the first ML model, selecting a second ML model to achieve the performance target, activating the second ML model in place of the first ML model, or activating a non-ML model to perform the first functionality.

Aspect 40. The method of any one of Aspects 23 to 39, further comprising: receive, from the network entity, information of a first ML model of the set of ML models associated with the first functionality.

Aspect 41. The method of Aspect 40, further comprising at least one of activating the first ML model, deactivating the first ML model, selecting a second ML model, activating the second ML model in place of the first ML model, or activating a non-ML model to perform the first functionality based on the information of the first ML model.

Aspect 42. The method of any one of Aspects 23 to 41, further comprising: training at least one ML model of the set of ML models based on one or more ML model parameters, data for training the at least one ML model, and a functionality performance target.

Aspect 43. The method of Aspect 42, further comprising: obtaining an expected performance associated with the first functionality based on the training of the at least one ML model, wherein a value of the expected performance is greater than a value of the functionality performance target.

Aspect 44. The method of any one of Aspects 23 to 4143 wherein at least one ML model of the set of ML models is trained by at least one of the network entity or another network entity in communication with the UE.

Aspect 45. An apparatus for wireless communications, the apparatus comprising: at least memory; and at least one processor coupled to the at least memory and configured to: receive, from a user equipment (UE), capability information related to a first functionality supported by a set of machine learning (ML) models of the UE; and output, for transmission to the UE, a performance target associated with the first functionality.

Aspect 46. The apparatus of Aspect 45, wherein the at least one processor is configured to output, for transmission to the UE, a plurality of performance targets associated with the first functionality.

Aspect 47. The apparatus of Aspect 46, wherein the plurality of performance targets are based on different complexities associated with different ML models.

Aspect 48. The apparatus of any one of Aspects 45 to 47, wherein the performance target comprises at least one of a training loss value associated with a first ML model of the set of ML models, a validation loss value associated with the first ML model, a testing loss associated with the first ML model, or a confidence level of an output of the first ML model.

Aspect 49. The apparatus of any one of Aspects 45 to 48, wherein the capability information comprises ML model information identifying at least one ML model associated with the first functionality supported by the UE.

Aspect 50. The apparatus of Aspect 49, wherein the ML model information comprises at least one identifier associated with a first ML model and an expected performance associated with the first ML model.

Aspect 51. The apparatus of any one of Aspects 45 to 50, wherein the at least one processor is configured to: output, for transmission to the UE, information of a first ML model of the set of ML models associated with the first functionality.

Aspect 52. The apparatus of any one of Aspects 45 to 51, wherein the at least one processor is configured to: receive, from the UE, an expected performance associated with the first functionality based on training of at least one ML model of the set of ML models, wherein a value of the expected performance is greater than a value of the functionality performance target.

Aspect 53. The apparatus of any one of Aspects 45 to 52, wherein at least one ML model of the set of ML models is trained by at least one of the apparatus or a network entity in communication with the UE.

Aspect 54. A method of wireless communications at a network entity, the method comprising: receiving, from a user equipment (UE), capability information related to a first functionality supported by a set of machine learning (ML) models of the UE; and transmitting, to the UE, a performance target associated with the first functionality.

Aspect 55. The method of Aspect 54, further comprising transmitting, to the UE, a plurality of performance targets associated with the first functionality.

Aspect 56. The method of Aspect 55, wherein the plurality of performance targets are based on different complexities associated with different ML models.

Aspect 57. The method of any one of Aspects 54 to 56, wherein the performance target comprises at least one of a training loss value associated with a first ML model of the set of ML models, a validation loss value associated with the first ML model, a testing loss associated with the first ML model, or a confidence level of an output of the first ML model.

Aspect 58. The method of any one of Aspects 54 to 57, wherein the capability information comprises ML model information identifying at least one ML model associated with the first functionality supported by the UE.

Aspect 59. The method of Aspect 58, wherein the ML model information comprises at least one identifier associated with a first ML model and an expected performance associated with the first ML model.

Aspect 60. The method of any one of Aspects 54 to 59, further comprising: transmitting, to the UE, information of a first ML model of the set of ML models associated with the first functionality.

Aspect 61. The method of any one of Aspects 54 to 60, further comprising: receiving, from the UE, an expected performance associated with the first functionality based on training of at least one ML model of the set of ML models, wherein a value of the expected performance is greater than a value of the functionality performance target.

Aspect 62. The method of any one of Aspects 54 to 61, wherein at least one ML model of the set of ML models is trained by at least one of the network entity or another network entity in communication with the UE.

Aspect 63. A non-transitory computer-readable storage medium comprising instructions stored thereon which, when executed by at least one processor, causes the at least one processor to perform operations according to any of Aspects 23 to 44.

Aspect 64. An apparatus for wireless communications comprising one or more means for performing operations according to any of Aspects 23 to 44.

Aspect 65. A non-transitory computer-readable storage medium comprising instructions stored thereon which, when executed by at least one processor, causes the at least one processor to perform operations according to any of Aspects 54 to 62.

Aspect 66. An apparatus for wireless communications comprising one or more means for performing operations according to any of Aspects 54 to 62.

What is claimed is:

1. An apparatus for wireless communications, the apparatus comprising:

at least memory; and at least one processor coupled to the at least memory and configured to:

output, for transmission to a network entity, capability information related to a first functionality supported by a plurality of machine learning (ML) models of the apparatus;

receive, from the network entity, a performance target associated with the first functionality, and transmit a message based on the first functionality performed using a first ML model selected from the plurality of ML models based on the performance target.

2. The apparatus of claim 1, wherein the at least one processor is configured to receive a plurality of performance targets associated with the first functionality, and the plurality of performance targets are based on different complexities associated with different ML models.

3. The apparatus of claim 1, wherein the at least one processor is configured to:

determine whether a performance of at least one ML model of the plurality of ML models associated with the first functionality satisfies the performance target related to at least one of training, validation, or test metrics.

4. The apparatus of claim 1, wherein the at least one processor is configured to:

monitor a performance of the first ML model of the plurality of ML models based on information collected at the apparatus or received from the network entity.

5. The apparatus of claim 1, wherein the at least one processor is configured to:

monitor a performance of at least one inactive ML model of the plurality of ML models associated with the first functionality; and at least one of activate the first functionality, deactivate the first functionality, or switch to a second functionality in place of the first functionality based on the performance target.

6. The apparatus of claim 1, wherein the at least one processor is configured to:

monitor a performance of the first ML model based on information collected at the apparatus based on an expected performance associated with the first ML model.

7. The apparatus of claim 6, wherein the at least one processor is configured to at least one of activate the first ML model based on the expected performance, deactivate the first ML model based on the performance of the first ML model, select a second ML model to achieve the performance target, activate the second ML model in place of the first ML model, or activate a non-ML model to perform the first functionality.

8. The apparatus of claim 1, wherein the at least one processor is configured to:

train at least one ML model of the plurality of ML models based on one or more ML model parameters, data for training the at least one ML model, and a functionality performance target.

9. The apparatus of claim 8, wherein the at least one processor is configured to:

obtain an expected performance associated with the first functionality based on the training of the at least one ML model, wherein a value of the expected performance is greater than a value of the functionality performance target.

10. The apparatus of claim 1, wherein at least one ML model of the plurality of ML models is trained by at least one of the network entity or another network entity in communication with the apparatus.

11. A method of wireless communications at a user equipment (UE), the method comprising:

transmitting, to a network entity, capability information related to a first functionality supported by a plurality of machine learning (ML) models of the UE;

receiving, from the network entity, a performance target associated with the first functionality; and transmitting a message based on the first functionality performed using a first ML model selected from the plurality of ML models based on the performance target.

12. The method of claim 11, wherein receiving the performance target comprises receiving a plurality of performance targets associated with the first functionality.

13. The method of claim 11, further comprising:

determining whether a performance of at least one ML model of the plurality of ML models associated with the first functionality satisfies the performance target related to at least one of training, validation, or test metrics.

14. The method of claim 11, further comprising:

monitoring a performance of the first ML model of the plurality of ML models based on information collected at the UE or received from the network entity.

15. The method of claim 11, further comprising:

monitoring a performance of at least one inactive ML model of the plurality of ML models associated with the first functionality; and at least one of activating the first functionality, deactivating the first functionality, or switching to a second functionality in place of the first functionality based on the performance target.

16. The method of claim 11, further comprising:

monitoring a performance of the first ML model based on information collected at the UE based on an expected performance associated with the first ML model.

17. The method of claim 16, further comprising at least one of activating the first ML model based on the expected performance, deactivating the first ML model based on the performance of the first ML model, selecting a second ML model to achieve the performance target, activating the second ML model in place of the first ML model, or activating a non-ML model to perform the first functionality.

18. The method of claim 11, further comprising:

training at least one ML model of the plurality of ML models based on one or more ML model parameters, data for training the at least one ML model, and a functionality performance target.

19. The method of claim 18, further comprising:

obtaining an expected performance associated with the first functionality based on the training of the at least one ML model, wherein a value of the expected performance is greater than a value of the functionality performance target.

20. The method of claim 11, wherein at least one ML model of the plurality of ML models is trained by at least one of the network entity or another network entity in communication with the UE.

21. An apparatus for wireless communications, the apparatus comprising:

one or more memories; and one or more processors coupled to the one or more memories and configured to:

receive, from a user equipment (UE), capability information related to a first functionality supported by a plurality of machine learning (ML) models of the UE; and output, for transmission to the UE, a performance target associated with the first functionality.

22. The apparatus of claim 21, wherein the one or more processors are configured to output, for transmission to the UE, a plurality of performance targets associated with the first functionality.

23. The apparatus of claim 21, wherein the one or more processors are configured to:

output, for transmission to the UE, information of a first ML model of the plurality of ML models associated with the first functionality.

24. The apparatus of claim 21, wherein the one or more processors are configured to:

receive, from the UE, an expected performance associated with the first functionality based on training of at least one ML model of the plurality of ML models, wherein a value of the expected performance is greater than a value of a functionality performance target.

25. The apparatus of claim 21, wherein at least one ML model of the plurality of ML models is trained by at least one of the apparatus or a network entity in communication with the UE.

26. A method of wireless communications at a network entity, the method comprising:

receiving, from a user equipment (UE), capability information related to a first functionality supported by a plurality of machine learning (ML) models of the UE; and transmitting, to the UE, a performance target associated with the first functionality.

27. The method of claim 26, further comprising transmitting, to the UE, a plurality of performance targets associated with the first functionality.

28. The method of claim 26, further comprising:

transmitting, to the UE, information of a first ML model of the plurality of ML models associated with the first functionality.

29. The method of claim 26, further comprising:

receiving, from the UE, an expected performance associated with the first functionality based on training of at least one ML model of the plurality of ML models, wherein a value of the expected performance is greater than a value of a functionality performance target.

30. The method of claim 26, wherein at least one ML model of the plurality of ML models is trained by at least one of the network entity or another network entity in communication with the UE.

* * * * *